United States Patent
Tanaka et al.

(10) Patent No.: US 9,469,330 B2
(45) Date of Patent: Oct. 18, 2016

(54) STEERING SYSTEM

(71) Applicant: JTEKT CORPORATION, Osaka-shi, Osaka (JP)

(72) Inventors: Hidenobu Tanaka, Shiki-gun (JP); Yoshihito Yoshihara, Kashihara (JP); Atsumune Nagatani, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/733,148

(22) Filed: Jun. 8, 2015

(65) Prior Publication Data
US 2015/0367878 A1 Dec. 24, 2015

(30) Foreign Application Priority Data
Jun. 20, 2014 (JP) .................. 2014-127227

(51) Int. Cl.
*B62D 1/184* (2006.01)
*B62D 1/185* (2006.01)
*B62D 1/189* (2006.01)

(52) U.S. Cl.
CPC ............... *B62D 1/184* (2013.01); *B62D 1/185* (2013.01); *B62D 1/189* (2013.01)

(58) Field of Classification Search
CPC ....... B62D 1/184; B62D 1/185; B62D 1/189
See application file for complete search history.

(56) References Cited

U.S. PATENT DOCUMENTS

| | | | | |
|---|---|---|---|---|
| 5,743,150 A * | 4/1998 | Fevre | ...................... | B62D 1/184 280/775 |
| 6,092,957 A * | 7/2000 | Fevre | ...................... | B62D 1/184 280/775 |
| 6,848,716 B2 * | 2/2005 | Lutz | ........................ | B62D 1/184 280/775 |
| 7,475,908 B2 * | 1/2009 | Senn | ...................... | B62D 1/197 280/775 |
| 7,635,149 B2 * | 12/2009 | Menjak | .................. | B62D 1/184 280/775 |
| 7,810,409 B2 * | 10/2010 | Okada | .................... | B62D 1/184 280/775 |
| 8,006,587 B2 * | 8/2011 | Schnitzer | ............... | B62D 1/184 74/493 |
| 8,413,541 B2 * | 4/2013 | Davies | .................. | B62D 1/184 280/777 |
| 8,505,408 B2 * | 8/2013 | Havlicek | ............... | B62D 1/184 280/775 |
| 8,984,983 B2 * | 3/2015 | Hansen | .................. | B62D 1/184 280/775 |
| 9,033,368 B2 * | 5/2015 | Ku | ........................ | B62D 1/187 280/775 |

(Continued)

FOREIGN PATENT DOCUMENTS

JP          2008-049830 A        3/2008

OTHER PUBLICATIONS

May 24, 2016 Extended European Search Report issued in European Patent Application No. 15171715.4.

*Primary Examiner* — Drew Brown
*Assistant Examiner* — Timothy Wilhelm
(74) *Attorney, Agent, or Firm* — Oliff PLC

(57) ABSTRACT

A lock device of a steering system includes a tongue piece unit and a frame plate held on a first side plate. The tongue piece unit includes elastic tongue pieces supported in a cantilever manner by a vertical frame provided along at least one of longitudinal edge portions of at least one of first side plates to form a row that extends in a tilt direction. The frame plate includes partitioning portions, between which a plurality of grooves are formed to house the elastic tongue pieces so as to be projectable. When a steering column is locked, some of the elastic tongue pieces are pressed by a pressing surface of a tightening member to be retracted into grooves. Consequently, the tightening member is interposed between the elastic tongue pieces projecting from the grooves in the tilt direction.

20 Claims, 19 Drawing Sheets

(56) References Cited

U.S. PATENT DOCUMENTS

| | | | | |
|---|---|---|---|---|
| 9,156,490 | B2* | 10/2015 | Kwon | B62D 1/187 |
| 9,156,491 | B2* | 10/2015 | Okano | B62D 1/187 |
| 9,187,115 | B2* | 11/2015 | Kakishita | B62D 1/184 |
| 2008/0185829 | A1 | 8/2008 | Senn | |
| 2011/0088501 | A1* | 4/2011 | Park | B62D 1/184 |
| | | | | 74/493 |
| 2011/0210537 | A1 | 9/2011 | Uesaka | |
| 2013/0074641 | A1* | 3/2013 | Schnitzer | B62D 1/184 |
| | | | | 74/493 |
| 2013/0160596 | A1* | 6/2013 | Tanaka | B62D 1/185 |
| | | | | 74/493 |

* cited by examiner

STEERING SYSTEM

INCORPORATION BY REFERENCE

The disclosure of Japanese Patent Application No. 2014-127227 filed on Jun. 20, 2014 including the specification, drawings and abstract, is incorporated herein by reference in its entirety.

BACKGROUND OF THE INVENTION

1. Field of the Invention

The present invention relates to a steering system.

2. Description of the Related Art

Hitherto, it has been attempted, in a lock device that locks a steering column in position after tilt adjustment, to achieve strong lock by meshing teeth provided on a fixed member and teeth provided on a movable member with each other. However, so-called "half lock" in which the top portions of the teeth contact each other is occasionally caused. In the case where half lock is caused, a reliable locked state is not achieved.

Japanese Patent Application Publication No. 2008-49830 (JP 2008-49830 A) proposes a lock device that includes a plurality of plate members, a push-in member, and an urging member. The plate members are held on a holder attached to a fixed bracket. The push-in member moves in accompaniment with a steering column. The urging member urges the plate members. In the lock device, the push-in member pushes in some of the plurality of plate members so that the push-in member is interposed between plate members on both sides of the plate members which have been pushed in. When the push-in member is retracted from the plate members, the plate members which have been pushed in by the push-in member return to the state before the plate members are pushed in through the elastic restoring force of the urging member. In JP 2008-49830 A, teeth are not meshed with each other, and therefore half lock is not caused.

In the steering system according to JP 2008-49830 A, it is necessary to provide components such as the plurality of plate members, the urging member, and the holder which holds such members in order to prevent occurrence of half lock, which increases the number of components.

SUMMARY OF THE INVENTION

It is an object of the present invention to provide a steering system that is capable of achieving strong lock and preventing occurrence of half lock while suppressing an increase in number of components.

According to an aspect of the present invention, a steering system that is capable of tilt adjustment, includes: a steering shaft, to one end of which a steering member is coupled; a tubular steering column that supports the steering shaft; a first bracket that is fixed to a vehicle body and that includes a pair of first side plates; a second bracket that is fixed to the steering column and that includes a pair of second side plates; and a lock device that locks the steering column in position and that includes a tightening shaft inserted through tilt long grooves of the first side plates and insertion grooves of the second side plates, an operation lever that rotates together with the tightening shaft, and a pair of tightening members that include a pressing surface, that are supported by the tightening shaft to move in accompaniment with the tightening shaft and the steering column during tilt adjustment, and that tighten each of the first side plates to a corresponding one of the second side plates as the operation lever is operated to rotate in a lock direction. In the steering system, the tilt long grooves each include a pair of longitudinal edge portions that extend in a tilt direction; the lock device further includes a tongue piece unit that includes a support portion provided along at least one of the longitudinal edge portions of at least one of the first side plates, and a plurality of elastic tongue pieces supported in a cantilever manner by the support portion to extend from the support portion in a direction that is generally orthogonal to the tilt direction to form a row that extends in the tilt direction, the elastic tongue pieces being pressed by the pressing surface of the corresponding tightening member and warped when the steering column is locked, and partitioning elements, between which a plurality of grooves are formed to house the elastic tongue pieces so as to be projectable, that are capable of restrict movement of the corresponding elastic tongue pieces in the tilt direction, and that are formed on an outer surface of the corresponding first side plate or a member held on the outer surface; and when the steering column is locked, the pressing surface of the corresponding tightening member presses some of the elastic tongue pieces to retract the elastic tongue pieces into the grooves so that the corresponding tightening member is interposed between the elastic tongue pieces projecting from the grooves in the tilt direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 8A and 8B are sectional views of a first tightening member and the one of the first side plates taken along the line VIII-VIII of FIG. 7, in which FIG. 8A illustrates an unlocked state and FIG. 8B illustrates a locked state;

FIGS. 10A and 10B are sectional views of a second tightening member and the other of the first side plates taken along the line X-X of FIG. 9, in which FIG. 10A illustrates an unlocked state and FIG. 10B illustrates a locked state;

FIGS. 14A and 14B are sectional views around a first side plate according to a third embodiment of the present invention, in which FIG. 14A illustrates a state in which a tightening member and elastic tongue pieces are engaged with each other and FIG. 14B illustrates a state in which inner wall portions of recessed grooves and the elastic tongue pieces are engaged with each other;

DETAILED DESCRIPTION OF EMBODIMENTS

Figure 1:
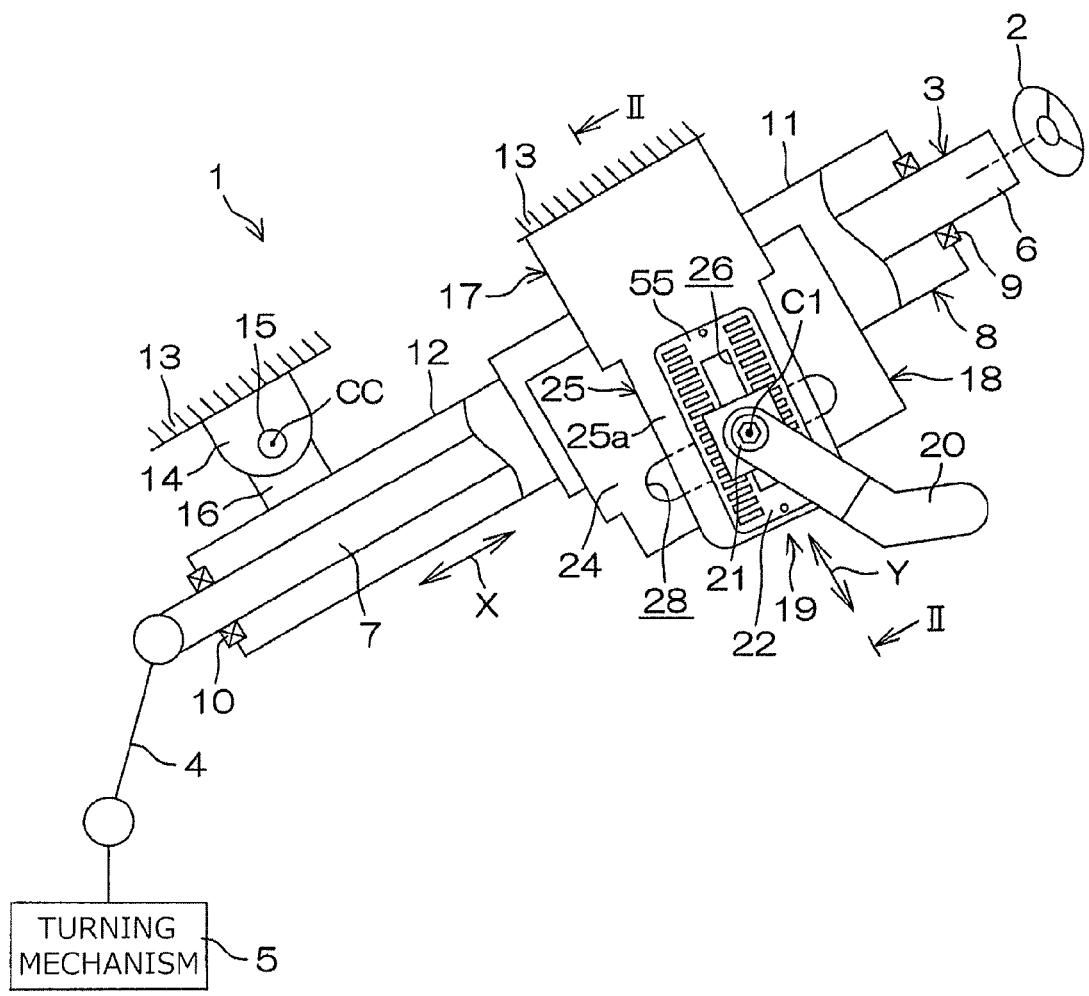
FIG. 1 is a partially cut-away, schematic side view illustrating a schematic configuration of a steering system according to a first embodiment of the present invention.

An embodiment of the present invention will be described in detail below with reference to the accompanying drawings. FIG. 1 is a partially cut-away, schematic side view illustrating a schematic configuration of a steering system 1 according to a first embodiment of the present invention. With reference to FIG. 1, the steering system 1 includes a steering shaft 3 and a turning mechanism 5. A steering member 2 such as a steering wheel is coupled to one end of the steering shaft 3 in an axial direction X. The turning mechanism 5 is coupled to the steering shaft 3 via an intermediate shaft 4 etc.

The turning mechanism 5 is a rack-and-pinion mechanism, for example, that turns turning wheels (not illustrated) in conjunction with a steering operation of the steering member 2. Rotation of the steering member 2 is transferred to the turning mechanism 5 via the steering shaft 3, the intermediate shaft 4, etc. Rotation transferred to the turning mechanism 5 is converted into axial movement of a rack shaft (not illustrated). Consequently, the turning wheels are turned.

The steering shaft 3 includes a tubular upper shaft 6 and a lower shaft 7. The upper shaft 6 is fitted so as to be relatively slidable through spline fitting or serration fitting, for example. The steering member 2 is coupled to one end of the upper shaft 6. The steering shaft 3 is telescopic in the axial direction X. The steering system 1 includes a hollow steering column 8 that rotatably supports the steering shaft 3. The steering shaft 3 is inserted through the steering column 8, and supported by the steering column 8 so as to be rotatable via a plurality of bearings 9 and 10.

The steering column 8 includes a tubular upper column 11 and a tubular lower column 12. The upper column 11 is an outer column, for example, fitted so as to be relatively slidable. The lower column 12 is an inner column, for example. The steering column 8 is telescopic in the axial direction X. The upper column 11 supports the upper shaft 6 so as to be rotatable via the bearing 9. The upper column 11 is coupled to the upper shaft 6 so as to be movable in accompaniment in the axial direction X of the steering shaft 3 via the bearing 9.

The steering system 1 includes a fixed bracket 14, a tilt support shaft 15, and a column bracket 16. The fixed bracket 14 is fixed to a vehicle body 13. The tilt support shaft 15 is supported by the fixed bracket 14. The column bracket 16 is fixed to the outer periphery of the lower column 12, and rotatably supported by the tilt support shaft 15. The steering column 8 and the steering shaft 3 are turnable (tiltable) in a tilt direction Y about a tilt center CC which is the center axis of the tilt support shaft 15.

The steering shaft 3 and the steering column 8 are turned (tilted) about the tilt center CC. Consequently, the position of the steering member 2 is adjusted in the tilt direction Y (so-called "tilt adjustment"). The steering shaft 3 and the steering column 8 are telescopic in the axial direction X. Consequently, the position of the steering member 2 is adjusted in the telescopic direction (axial direction X) (so-called "telescopic adjustment").

The steering system 1 includes a first bracket 17, a second bracket 18 (corresponding to a distance bracket), and a lock device 19. The first bracket 17 is attached to the vehicle body 13. The second bracket 18 is fixed to the upper column 11 of the steering column 8. The lock device 19 locks the brackets 17 and 18 to each other. Consequently, the steering column 8 is fixed in position with respect to the vehicle body 13 to fix the steering member 2 in position.

The lock device 19 includes an operation lever 20, a tightening shaft 21, and a holding force improving mechanism 22. The operation lever 20 is manually operated by a driver to be rotated. The tightening shaft 21 is rotatable together with the operation lever 20, and inserted through the brackets 17 and 18. The holding force improving mechanism 22 improves a holding force for holding the steering member 2 in position in the tilt direction Y. A center axis C1 of the tightening shaft 21 corresponds to the center of rotation of the operation lever 20. The tightening shaft 21 extends in a direction that is orthogonal to the tilt direction Y and the telescopic direction (axial direction X).

The holding force improving mechanism 22 is held along an outer surface 25a of at least one of a pair of first side plates 25 (in FIG. 1, only one of the first side plates 25 is illustrated) of the first bracket 17. The holding force improving mechanism 22 includes a frame plate 55 fixed to the outer surface 25a. In the embodiment, the holding force improving mechanism 22 will be described in an example in which the holding force improving mechanism 22 is provided to each of the outer surfaces 25a of the pair of first side plates 25 (see FIG. 2).

The tightening shaft 21 is inserted through tilt long grooves 26 and telescopic long grooves 28. The tilt long grooves 26 are provided in the pair of first side plates 25 of the first bracket 17. The telescopic long grooves 28 are insertion grooves that are provided in a pair of second side plates 27 (in FIG. 1, only one of the second side plates 27 is illustrated) of the second bracket 18 and extend in the telescopic direction (corresponding to the axial direction X). The tightening shaft 21 moves in the telescopic direction along the telescopic long grooves 28 during telescopic adjustment. The tightening shaft 21 moves in the tilt direction Y along the tilt long grooves 26 during tilt adjustment.

Figure 2:
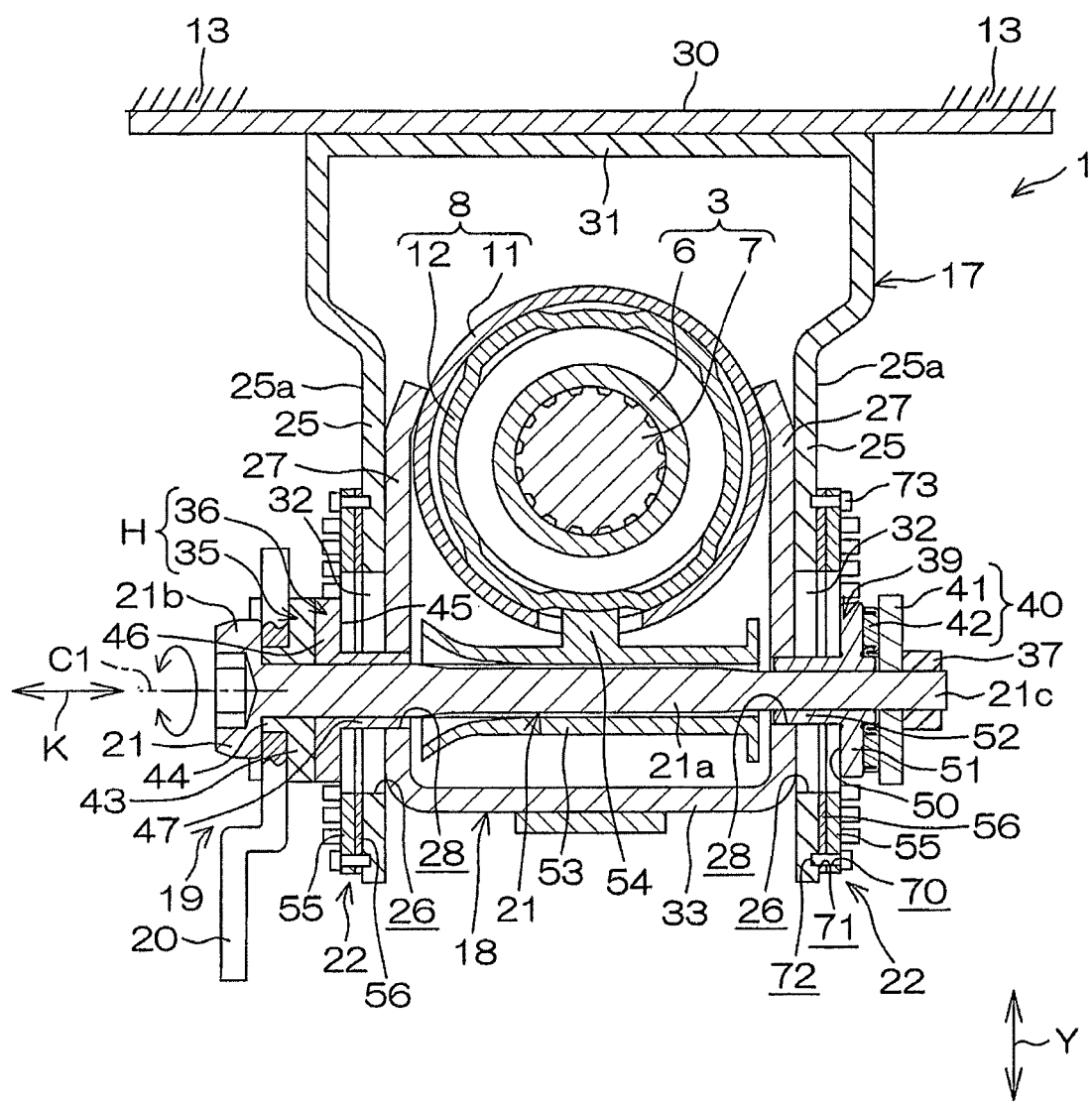
FIG. 2 is a sectional view of the steering system taken along the line II-II of FIG. 1.
Figure 3:
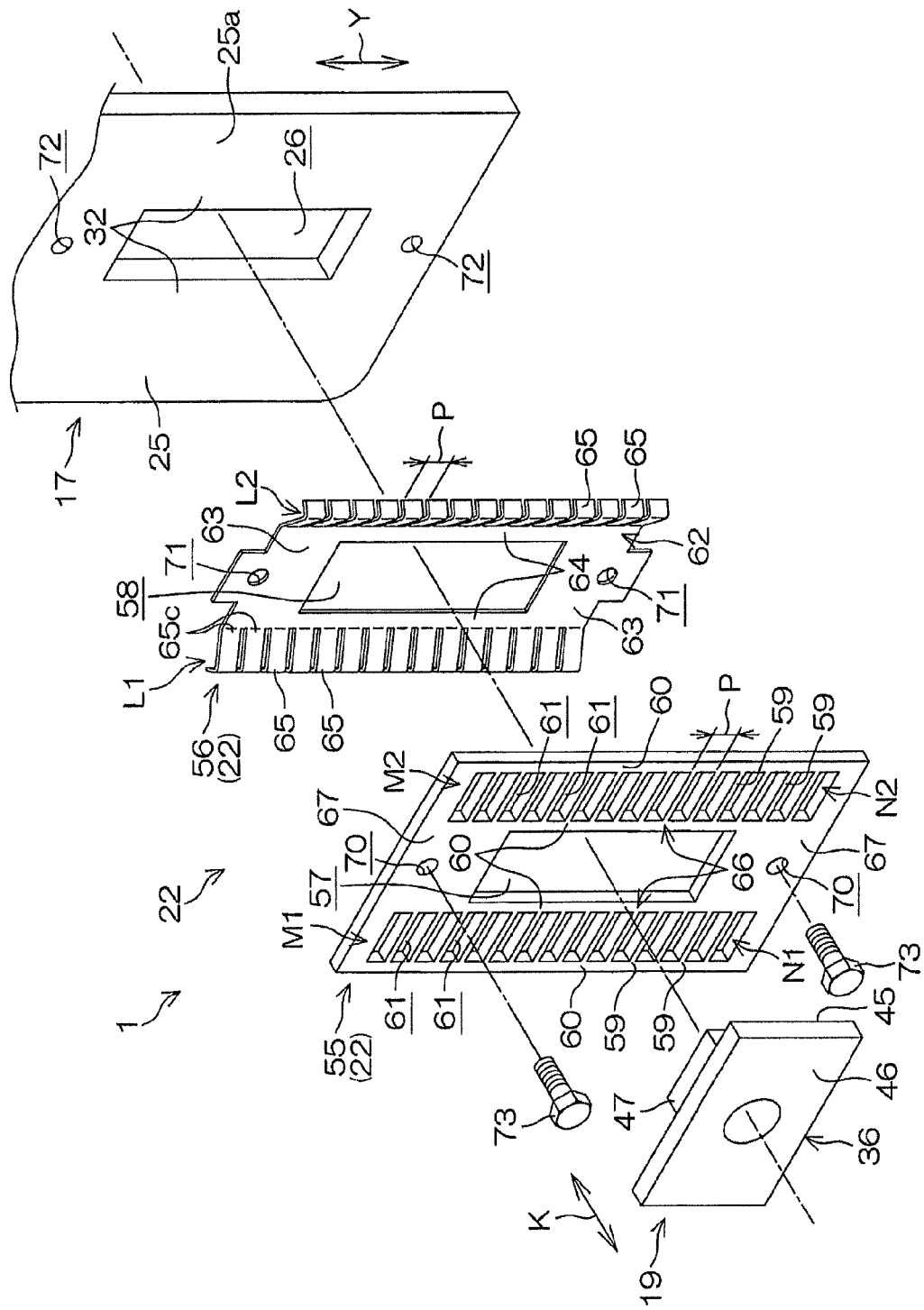
FIG. 3 is a perspective view of a lock device around one of first side plates of a first bracket as disassembled.

As illustrated in FIG. 2, the first bracket 17 includes an attachment plate 30, a top plate 31, and the pair of first side plates 25. The attachment plate 30 is removably supported on the vehicle body 13 via a capsule mechanism (not illustrated). The top plate 31 is fixed along the attachment plate 30. The first side plates 25 extend downward in the tilt direction Y from both ends of the top plate 31. As illustrated in FIG. 3, the long groove 26 provided in the first side plate 25 includes a pair of longitudinal edge portions 32 that extend in the tilt direction Y.

The second bracket 18 includes the pair of second side plates 27 and a coupling plate 33, and has a groove shape. The pair of second side plates 27 face the respective inner surfaces of the pair of first side plates 25 of the first bracket 17. The coupling plate 33 couples the lower ends of the pair of second side plates 27 in the tilt direction Y to each other. As illustrated in FIG. 2, the tightening shaft 21 is a bolt that includes a shaft portion 21a, a head portion 21b, and a threaded portion 21c. The shaft portion 21a penetrates the side plates 25 and 27. The head portion 21b is provided at one end of the shaft portion 21a. The threaded portion 21c is provided at the other end of the shaft portion 21a. The head portion 21b is fixed so as to be rotatable together with the operation lever 20.

The lock device 19 includes a rotary cam 35 and a first tightening member 36. The rotary cam 35 rotates together with the operation lever 20. The first tightening member 36 constitutes a non-rotary cam that is cam-engaged with the rotary cam 35 to tighten the one of the first side plates 25. The operation lever 20, the rotary cam 35, the first tightening member 36, and one of the holding force improving mechanisms 22 including the frame plate 55 are interposed between the head portion 21b of the tightening shaft 21 and the one of the first side plates 25. The rotary cam 35 and the first tightening member 36 are supported by the shaft portion 21a in the vicinity of the head portion 21b of the tightening shaft 21. Movement of the rotary cam 35 in an axial direction K with respect to the tightening shaft 21 is restricted. The first tightening member 36 is movable in the axial direction K of the tightening shaft 21.

The lock device 19 includes a nut 37, a second tightening member 39, and an interposed member 40. The nut 37 is screw-engaged with the threaded portion 21c of the tightening shaft 21. The second tightening member 39 is interposed between the other of the first side plates 25 and the nut 37 to tighten the other of the second side plates 27. The interposed member 40 is interposed between the second tightening member 39 and the nut 37. The other of the holding force improving mechanisms 22 including the frame plate 55 is interposed between the nut 37 and the other of the first side plates 25.

The second tightening member 39 and the interposed member 40 are supported by the shaft portion 21a of the tightening shaft 21 in the vicinity of the nut 37 so as to be movable in the axial direction K. The interposed member 40 includes a washer 41 and a needle roller bearing 42. The washer 41 is interposed between the nut 37 and the second tightening member 39. The needle roller bearing 42 is interposed between the washer 41 and the second tightening member 39. The rotary cam 35 includes an annular plate 43 and a tubular boss 44. The annular plate 43 has a tightening shaft insertion hole. The boss 44 is provided to extend in the plate thickness direction from the annular plate 43, and coupled to a coupling hole of the operation lever 20 so as to be rotatable together.

Figure 7:
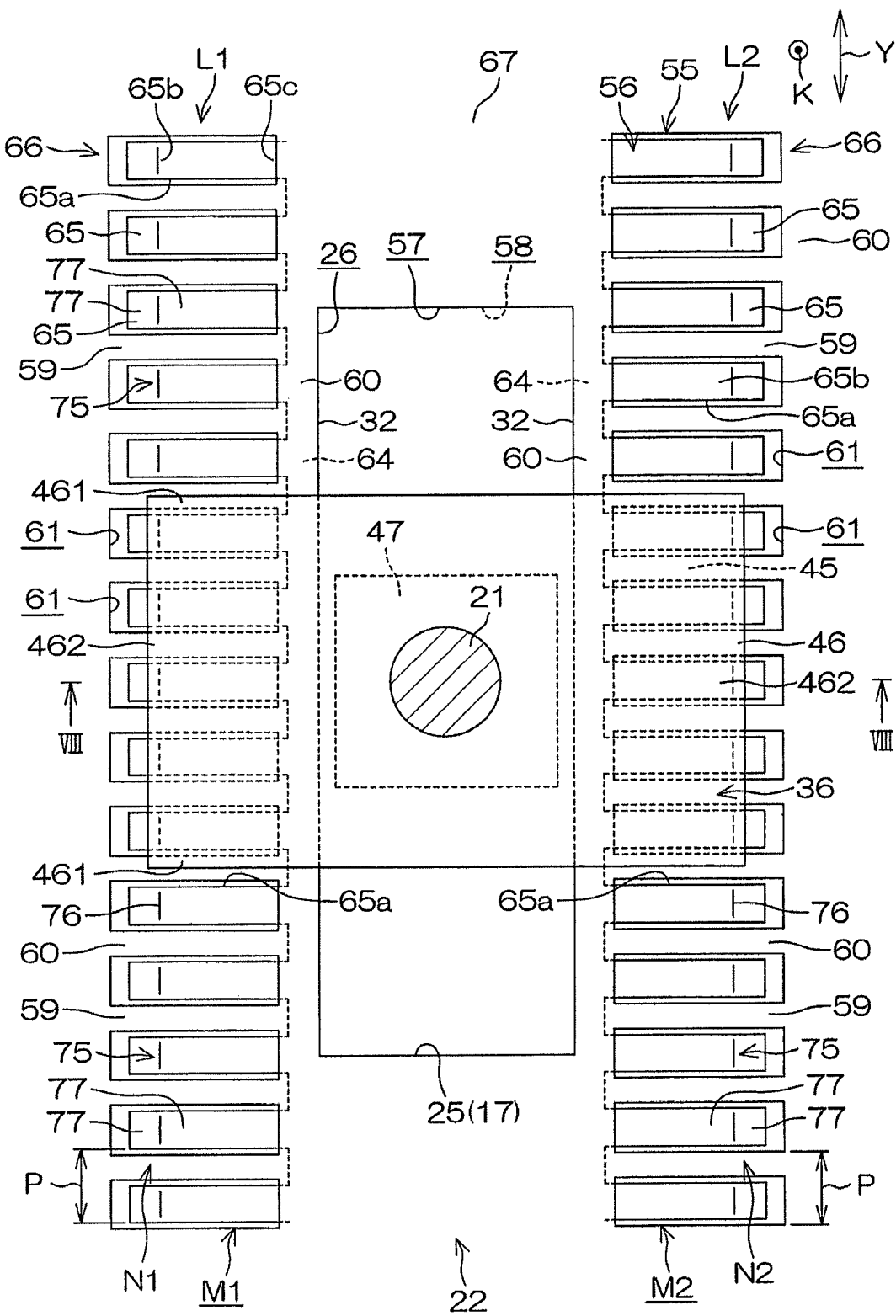
FIG. 7 is an enlarged view around a long groove in the one of the first side plates of the first bracket.

The first tightening member 36 which serves as a non-rotary cam includes a tightening plate 46 and a tubular boss 47. The tightening plate 46 has a pressing surface 45 that faces the one of the first side plates 25, and has a tightening shaft insertion hole. The boss 47 is provided to extend in the plate thickness direction of the tightening plate 46, and inserted through the long groove 26 of the one of the first side plates 25 so that rotation of the boss 47 is restricted by the long groove 26. As illustrated in FIG. 7, the tightening plate 46 has a generally rectangular shape as seen from the tightening direction (corresponding to the axial direction K of the tightening shaft 21). The tightening plate 46 includes a pair of first end portions 461 and a pair of second end portions 462. The pair of first end portions 461 oppose each other in the tilt direction Y. The pair of second end portions 462 oppose each other in the direction in which the pair of longitudinal edge portions 32 oppose each other (the direction which is orthogonal to the tilt direction Y).

Figure 9:
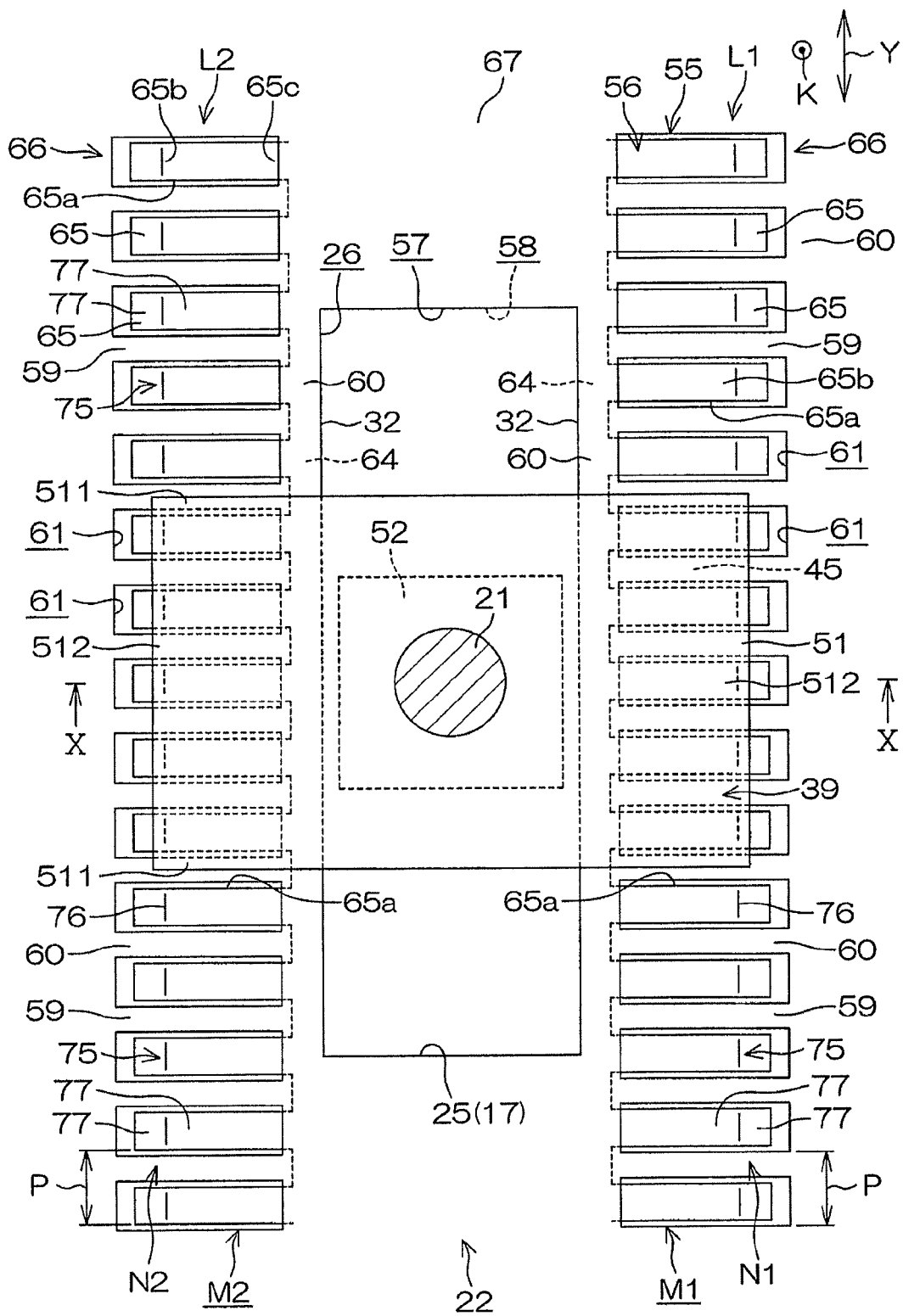
FIG. 9 is an enlarged view around a long groove in the other of the first side plates of the first bracket.

As illustrated in FIG. 2, the second tightening member 39 includes an annular tightening plate 51 and a tubular boss 52. The tightening plate 51 has a pressing surface 50 that faces the other of the first side plates 25, and has a tightening shaft insertion hole. The boss 52 is provided to extend in the plate thickness direction of the tightening plate 51, and inserted through the long groove 26 of the other of the first side plates 25 so that rotation of the boss 52 is restricted by the long groove 26. As illustrated in FIG. 9, the tightening plate 51 has a generally rectangular shape as seen from the tightening direction (corresponding to the axial direction K of the tightening shaft 21). The tightening plate 51 includes a pair of first end portions 511 and a pair of second end portions 512. The pair of first end portions 511 oppose each other in the tilt direction Y. The pair of second end portions 512 oppose each other in the direction in which the pair of longitudinal edge portions 32 oppose each other (the direction which is orthogonal to the tilt direction Y).

As illustrated in FIG. 2, a cam projection (not illustrated) is formed on one of the annular plate 43 of the rotary cam 35 and the tightening plate 46 of the non-rotary cam (first tightening member 36), and a cam surface to be engaged with the cam projection is formed on the other. The rotary cam 35 and the non-rotary cam (first tightening member 36) constitute a motion conversion mechanism H which is a cam mechanism that converts rotation input to the rotary cam 35 via the operation lever 20 into axial movement of the non-rotary cam (first tightening member 36) on the tightening shaft 21.

A sleeve 53 that rotates together with the tightening shaft 21 is fitted with the outer periphery of the shaft portion 21a of the tightening shaft 21 through serration fitting, for example. A push-up cam 54 is provided on the outer periphery of the sleeve 53 so as to be rotatable together. As the operation lever 20 is operated to rotate in the lock direction, the rotary cam 35 rotates with respect to the first tightening member 36 (non-rotary cam). Consequently, the first tightening member 36 is moved in the axial direction K of the tightening shaft 21 so that both the first side plates 25 of the first bracket 17 are held between the tightening plate 46 of the first tightening member 36 and the tightening plate 51 of the second tightening member 39. The first side plates 25 are then tightened to the second side plates 27.

Consequently, each first side plate 25 of the first bracket 17 is brought into press contact with the corresponding one of the second side plates 27 of the second bracket 18 to achieve tilt lock and telescopic lock. In addition, the push-up cam 54 pushes up the lower column 12 to lock the columns 11 and 12 to each other. When the operation lever 20 is operated to rotate in the direction opposite to the lock direction from the state in which tilt lock and telescopic lock is achieved, the tightening of the second side plates 27 by the tightening members 36 and 39 is released to enable tilt adjustment and telescopic adjustment. The tightening members 36 and 39 are supported by the tightening shaft 21 which moves in the tilt direction Y as the steering column 8 is turned in the tilt direction Y during tilt adjustment. Therefore, the tightening members 36 and 39 move in accompaniment with the tightening shaft 21 and the steering column 8 during tilt adjustment.

The holding force improving mechanism 22 will be described in detail. As illustrated in FIG. 3, the holding force improving mechanism 22 includes a tongue piece unit 56 and the frame plate 55. The tongue piece unit 56 includes a frame plate 62 and two elastic tongue piece rows L1 and L2. The frame plate 62 defines a long hole 58 that extends in the tilt direction Y. The elastic tongue piece rows L1 and L2 each include a plurality of elastic tongue pieces 65 that are supported in a cantilever manner by the frame plate 62. The plurality of elastic tongue pieces 65 of the elastic tongue piece rows L1 and L2 are arranged at equal intervals in the tilt direction Y with an arrangement pitch P. The long hole 58 overlaps the long groove 26 of the first side plate 25 as seen from the axial direction K.

Figure 4A:
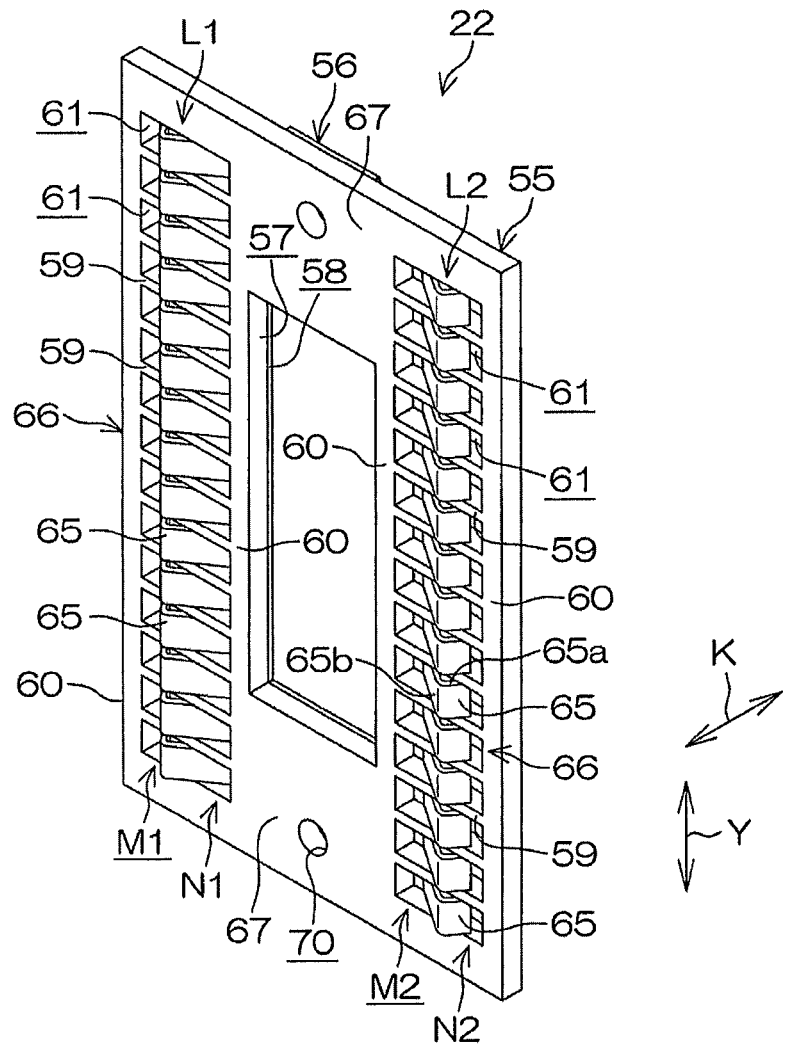
FIG. 4A is a perspective view of a tongue piece unit and a frame plate assembled to each other.

The frame plate 62 includes a pair of vertical frames 64 and a pair of horizontal frames 63. The pair of vertical frames 64 are support portions that support the elastic tongue pieces 65 of the elastic tongue piece rows L1 and L2. The pair of horizontal frames 63 couple both end portions (end portions in the tilt direction Y) of the pair of vertical frames 64 to each other. As illustrated in FIGS. 3 and 4A, the frame plate 55 includes a pair of vertical frames 66 and a pair of horizontal frames 67. The pair of vertical frames 66 define a long hole 57 that extends in the tilt direction Y. The pair of horizontal frames 67 couple both end portions (end portions in the tilt direction Y) of the pair of vertical frames 66 to each other. The long hole 57 overlaps the long groove 26 of the first side plate 25 as seen from the axial direction K.

As illustrated in FIG. 3, each vertical frame 66 includes a groove row M1, M2 and a partitioning portion row N1, N2. The groove row M1, M2 is composed of a plurality of grooves 61 that house the elastic tongue pieces 65 of the corresponding elastic tongue piece row L1, L2 so that the elastic tongue pieces 65 are projectable. The partitioning portion row N1, N2 is composed of a plurality of partitioning portions 59 that serve as partitioning elements that partition the grooves 61 of the groove row M1, M2. Each vertical frame 66 includes a pair of coupling frames 60 that couple the plurality of partitioning portions 59 of the corresponding partitioning portion row N1, N2 to each other into a grid shape.

The frame plate 55 and the frame plate 62 of the tongue piece unit 56 have screw insertion holes 70 provided in the pair of horizontal frames 67 of the frame plate 55 and screw insertion holes 71 provided in the pair of horizontal frames 63 of the frame plate 62 of the tongue piece unit 56, respectively. The frame plate 55 and the frame plate 62 of the tongue piece unit 56 are fixed to the first side plate 25 by a pair of fixing screw bolts 73 that are screwed into screw holes 72 of the first side plate 25. In this state, the frame plate 62 of the tongue piece unit 56 is disposed between the frame plate 55 and the first side plate 25.

Figure 4B:
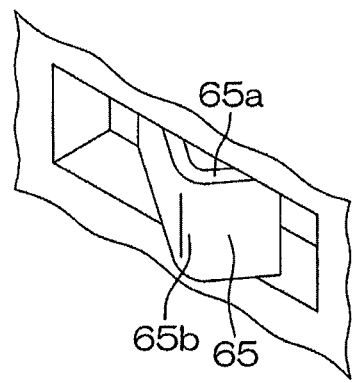
FIG. 4B is an enlarged view of an elastic tongue piece of FIG. 4A.
Figure 5:
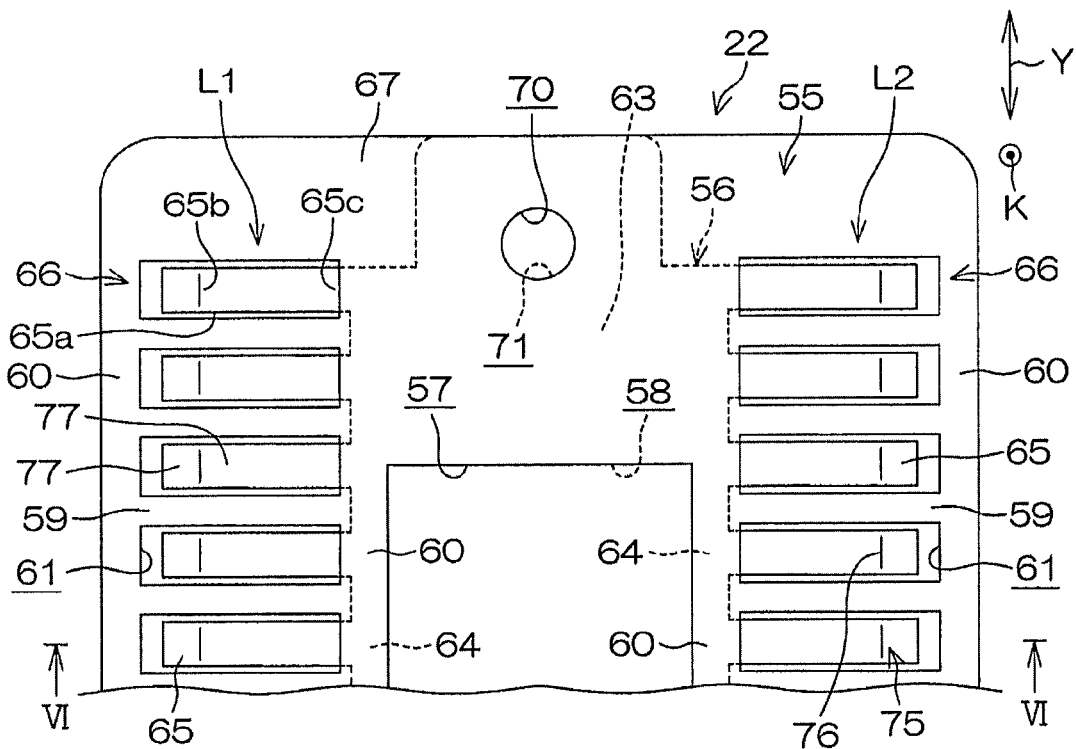
FIG. 5 is an enlarged view of a part of the tongue piece unit and the frame plate assembled to each other as seen from the plate thickness direction of the frame plate.
Figure 8A:
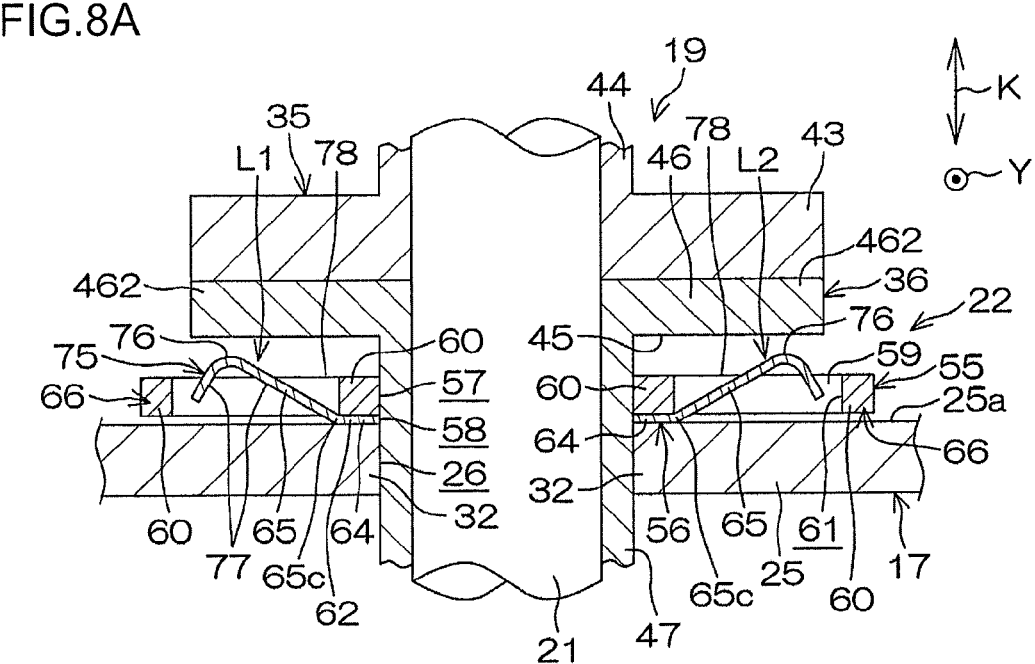
Figure 10A:
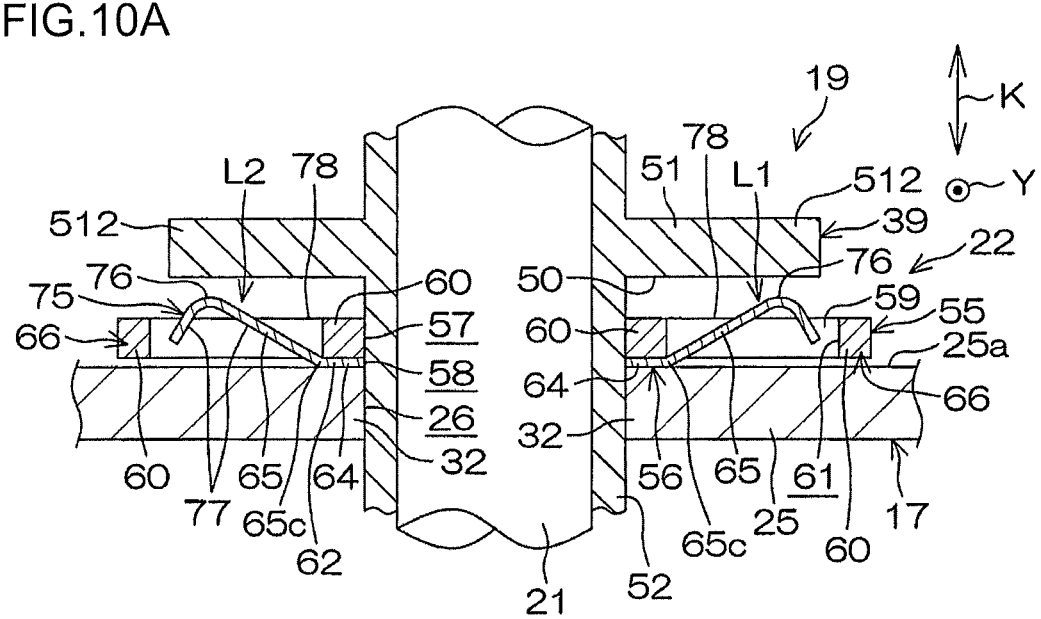

As illustrated in FIGS. 8A and 10A, the pair of vertical frames 64 of the frame plate 62 of the tongue piece unit 56 are held between the outer surface 25a of the first side plate 25 and the frame plate 55. In this state, each of the pair of vertical frames 64 extends along the corresponding one of the longitudinal edge portions 32. As illustrated in FIG. 5, the elastic tongue pieces 65 extend in a direction that is generally orthogonal to the tilt direction Y. As illustrated in FIG. 4B, each of the elastic tongue pieces 65 is a plate piece, and includes a plate thickness surface 65a and a plate surface 65b. The plate thickness surface 65a faces in the tilt direction Y, and extends in parallel with the plate thickness direction. The plate surface 65b extends in the tilt direction Y.

Figure 6:
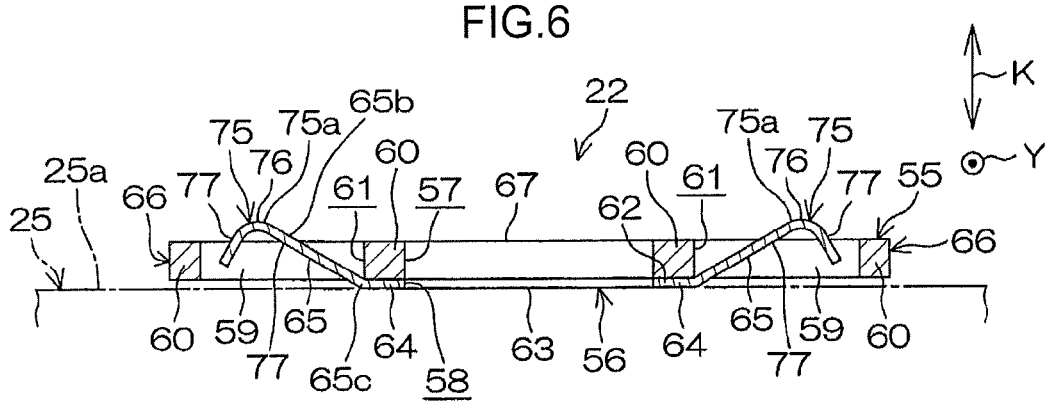
FIG. 6 is a sectional view of the tongue piece unit and the frame plate taken along the line VI-VI of FIG. 5.

As illustrated in FIG. 6, the elastic tongue pieces 65 each include an angled portion 75 that includes a top portion 76 and a pair of inclined surface portions 77 disposed on both sides of the top portion 76 and inclined in directions opposite to each other. A part 75a of the angled portion 75 including the top portion 76 projects from the groove 61 toward the side opposite to the first side plate 25. As illustrated in FIG. 5, movement of the elastic tongue pieces 65 in the tilt direction Y is restricted by the partitioning portions 59.

In such a holding force improving mechanism 22, as illustrated in FIG. 7, the tightening plate 46 of the first tightening member 36 faces the frame plate 55 attached to the one of the first side plates 25 in the tightening direction (corresponding to the axial direction K). Some of the elastic tongue pieces 65 of the elastic tongue piece rows L1 and L2 face the pressing surface 45 of the tightening plate 46 of the first tightening member 36 in the tightening direction (see FIG. 8A).

As illustrated in FIG. 9, the tightening plate 51 of the second tightening member 39 faces the frame plate 55 attached to the other of the first side plates 25 in the tightening direction (corresponding to the axial direction K of the tightening shaft 21). Some of the elastic tongue pieces 65 of the elastic tongue piece rows L1 and L2 face the pressing surface 50 of the tightening plate 51 of the second tightening member 39 in the tightening direction (axial direction K of the tightening shaft 21) (also see FIG. 10A). In an unlocked state illustrated in FIGS. 8A and 10A, the elastic tongue pieces 65 project from the corresponding grooves 61 toward the side opposite to the first side plate 25.

Figure 8B:
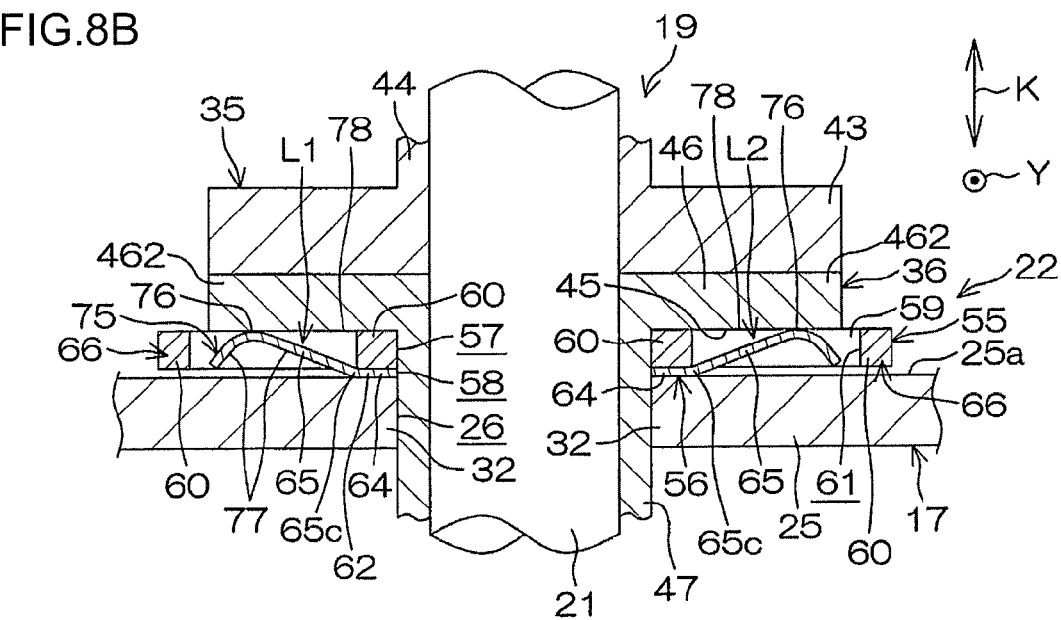
Figure 10B:
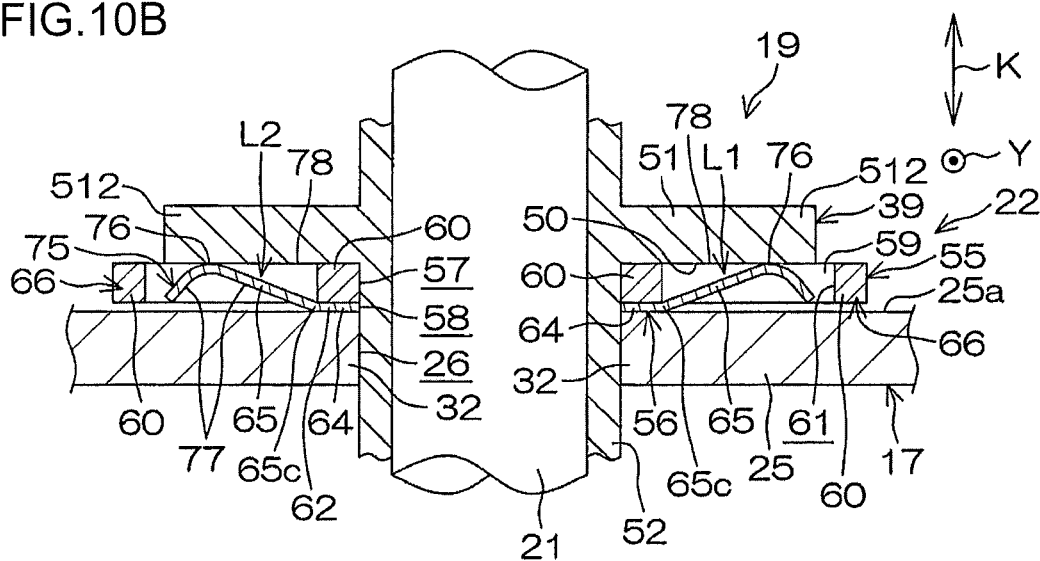

The operation lever 20 is operated from the unlocked state illustrated in FIGS. 8A and 10A to rotate in the lock direction to move the tightening members 36 and 39 in the tightening direction (corresponding to the axial direction K). Consequently, some of the elastic tongue pieces 65 of the elastic tongue piece rows L1 and L2 in the tilt direction Y are warped about a base end portion 65c (also see FIGS. 8B and 10B). When the steering column 8 is locked, as illustrated in FIGS. 8B and 10B, the elastic tongue pieces 65 pressed and warped by the pressing surface 45, 50 of the tightening member 36, 39 are retracted into the corresponding grooves 61. In this state, a tightening load applied by the pressing surface 45, 50 of the tightening member 36, 39 is received by a reception portion 78 constituted of the surfaces of the partitioning portions 59 of the partitioning portion rows N1 and N2 of the frame plate 55.

Figure 11:
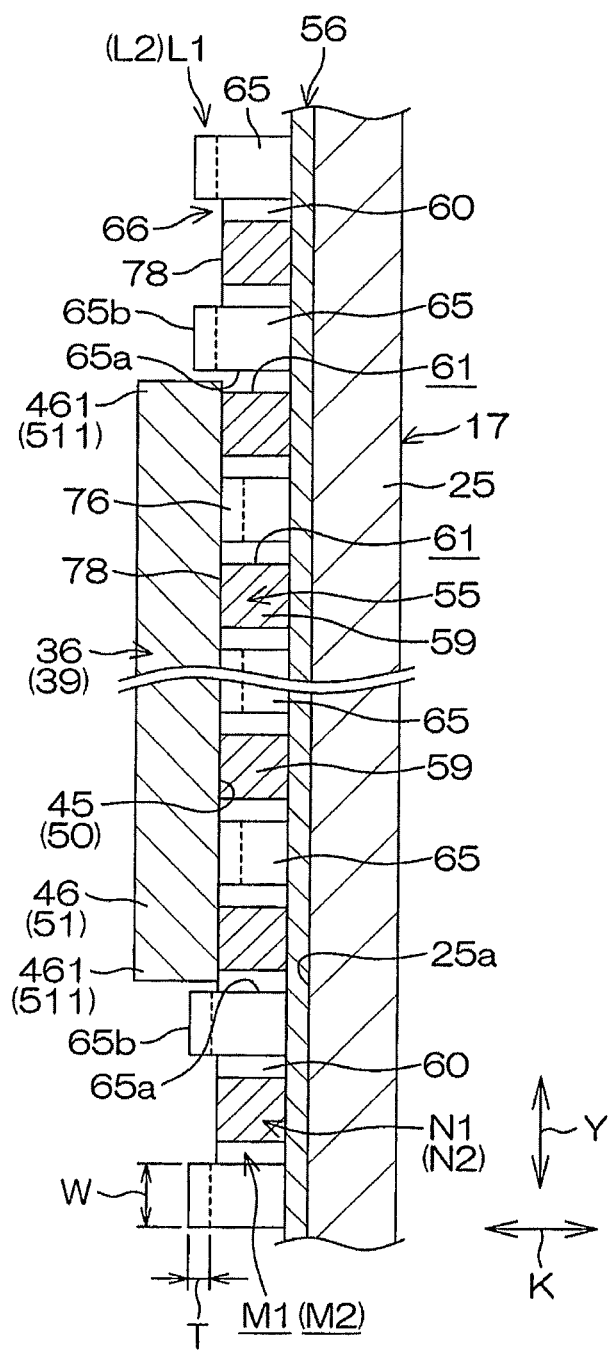
FIG. 11 is a sectional view around the one of the first side plates in the locked state, illustrating a state in which some of the elastic tongue pieces are retracted into grooves by the first tightening member.
Figure 12:
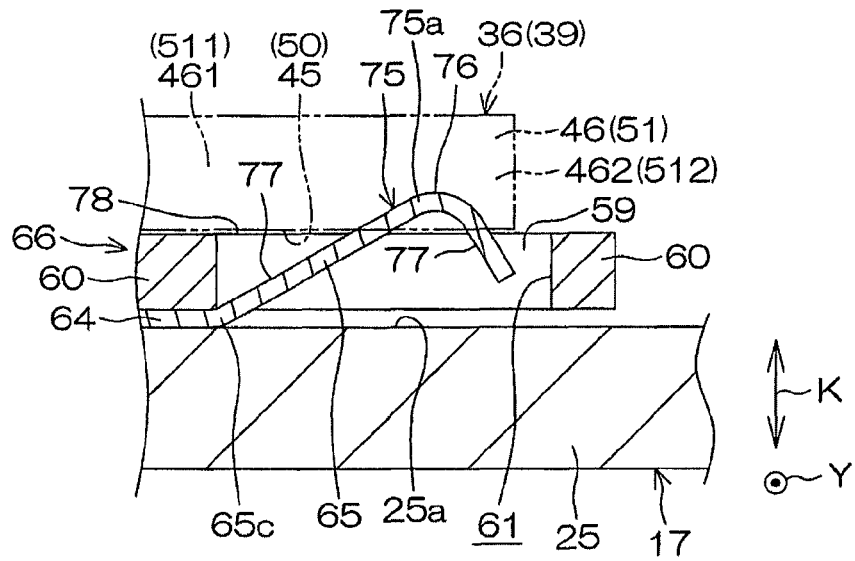
FIG. 12 is a sectional view around the first side plate, illustrating the vicinity of an elastic tongue piece engaged with the first tightening member.

In the locked state, as illustrated in FIG. 11, some of the elastic tongue pieces 65 of the elastic tongue piece row L1, L2 in the tilt direction Y are retracted into the grooves 61 by the pressing surface 45, 50 of the tightening member 36, 39. The tightening member 36, 39 is interposed between the elastic tongue pieces 65 which are not warped and project from the grooves 61 in the tilt direction Y. Upon a secondary collision, as illustrated in FIGS. 7 and 9, a shock in the tilt direction Y is applied to the steering member 2 to move the tightening member 36, 39, which is interposed between the elastic tongue pieces 65 projecting from the grooves 61, in the tilt direction Y. In this event, the first end portion 461, 511 of the tightening plate 46, 51 of the tightening member 36, 39 and the plate thickness surfaces 65a of the elastic tongue pieces 65, which are not warped and project from the grooves 61, are engaged with each other so that the elastic tongue pieces 65 receive a load in the tilt direction Y. Particularly, as illustrated in FIG. 12, the part 75a of the angled portion 75 projecting from the groove 61 receives a load in the tilt direction Y from the corresponding tightening member 36, 39 because of the engagement between the first end portion 461, 511 and the plate thickness surface 65a. In this event, the pair of inclined surface portions 77 are supported by the adjacent partitioning portion 59 so that the angled portion 75 is supported on both sides in the load application direction (tilt direction Y).

In the embodiment, the pressing surface 45, 50 of the tightening member 36, 39 retracts the elastic tongue pieces 65 into the grooves 61. Consequently, the steering column 8 can be locked in position without causing so-called half lock irrespective of the position of the tightening member 36, 39 in the tilt direction Y. In the locked state, when a shock in the tilt direction Y is applied to the steering member 2 upon a secondary collision, the end portions 461, 511 of the tightening member 36, 39 in the tilt direction Y project from the grooves 61 so as to face the elastic tongue pieces 65 in the tilt direction Y. Consequently, the tightening member 36, 39 abuts against the elastic tongue pieces 65, movement of which in the tilt direction Y is restricted by the corresponding partitioning portions 59, to restrict movement of the tightening member 36, 39 in the tilt direction Y. With members that face each other in the tilt direction Y (the tightening member 36, 39 and the elastic tongue pieces 65 projecting from the grooves 61) abutting against each other in the tilt direction Y, movement of the steering column 8 in the tilt direction Y is physically restricted. Consequently, strong lock with a large holding force can be achieved.

It is only necessary to provide the tongue piece unit 56 and the frame plate 55, which are each a single member. This suppresses an increase in number of components. When the steering column 8 is locked, the reception portion 78 of the partitioning portions 59 receive a tightening load from the tightening member 36, 39, while the elastic tongue pieces 65 are retracted into the grooves 61 and do not to receive an excessive tightening load. Hence, the durability of the elastic tongue pieces 65 can be improved.

The partitioning portions 59 are provided to the frame plate 55 which is fixed along the outer surface 25a of the first side plate 25. Consequently, the lock device 19 can be made thin compared to a steering system according to the related art which includes a plurality of plates to lock the steering column 8 in position through a friction force between the tightening members 36 and 39 and the first side plates 25. The pair of vertical frames 64 of the frame plate 62 of the tongue piece unit 56 are held between the frame plate 55 and the corresponding first side plate 25. Consequently, the pair of vertical frames 64 can be stably held on the first side plate 25.

Figure 13:
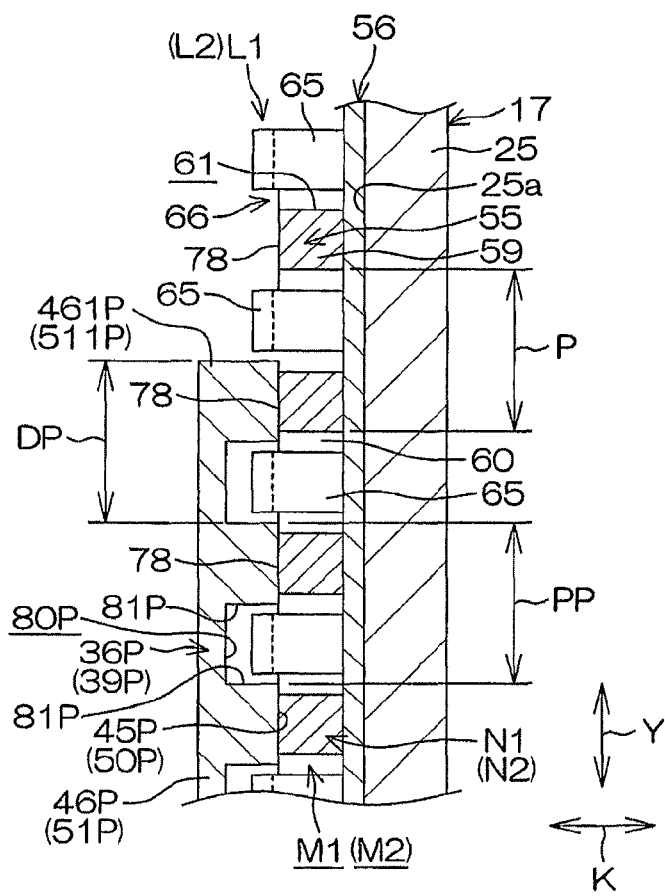
FIG. 13 is a sectional view around a first side plate according to a second embodiment of the present invention, illustrating a state in which elastic tongue pieces are housed in recessed grooves of a tightening member.

The elastic tongue pieces 65 receive a load in the tilt direction Y in the direction of the plate surface which is wider than the plate thickness surface 65a. This improves the strength against a load in the tilt direction Y. The angled portion 75 which projects from the groove 61 is supported on both sides by the partitioning portion 59. This further improves the strength against a load in the tilt direction Y. FIG. 13 illustrates a second embodiment of the present invention. The second embodiment illustrated in FIG. 13 is different from the first embodiment illustrated in FIG. 11 in that a pressing surface 45P, 50P of a tightening member 36P, 39P includes at least one recessed groove 80P that houses a corresponding elastic tongue piece 65 when the steering column 8 is locked. In the second embodiment, as in the example of FIG. 13, a plurality of the recessed grooves 80P are provided. It should be noted, however, that there may be only one recessed groove 80P.

In the following description, constituent elements of the second embodiment of FIG. 13 that are the same as those of the first embodiment are given the same reference symbols to omit description (the same applies to FIGS. 14 to 17 and 21). The recessed grooves 80P are portions of the pressing surface 45P, 50P that are recessed in the plate thickness direction of a tightening plate 46P, 51P (corresponding to the axial direction K). The recessed grooves 80 each include a pair of inner wall portions 81P that face the plate thickness surfaces 65a of the elastic tongue piece 65 in the tilt direction Y.

An arrangement pitch PP of the recessed grooves 80P in the tilt direction Y coincides with an integer multiple of the arrangement pitch P of the elastic tongue pieces 65. In the example of FIG. 13, the arrangement pitch PP and the arrangement pitch P coincide with each other. A distance DP between a first end portion 461P, 511P of the tightening plate 46P, 51P on one side in the tilt direction Y and the inner wall portion 81P of each recessed groove 80P on the other side in the tilt direction Y coincides with an integer multiple of the arrangement pitch P.

Figure 14A:
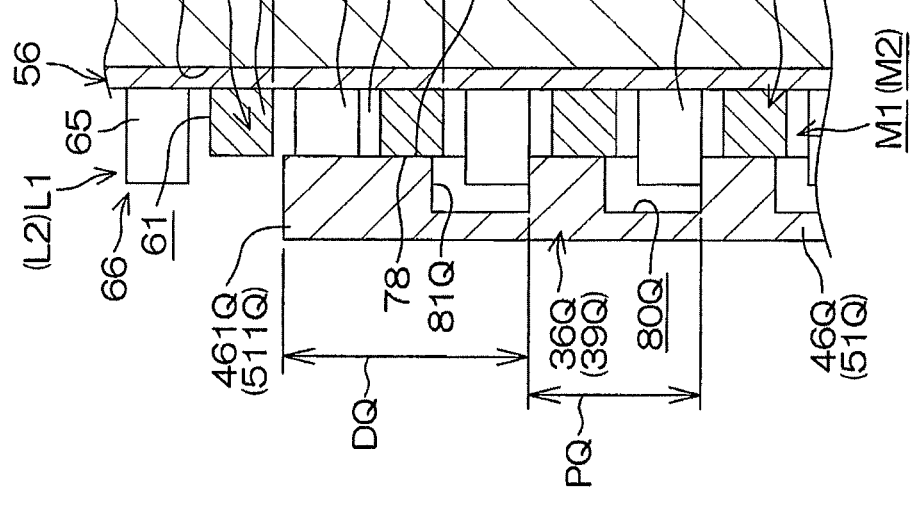
Figure 14B:
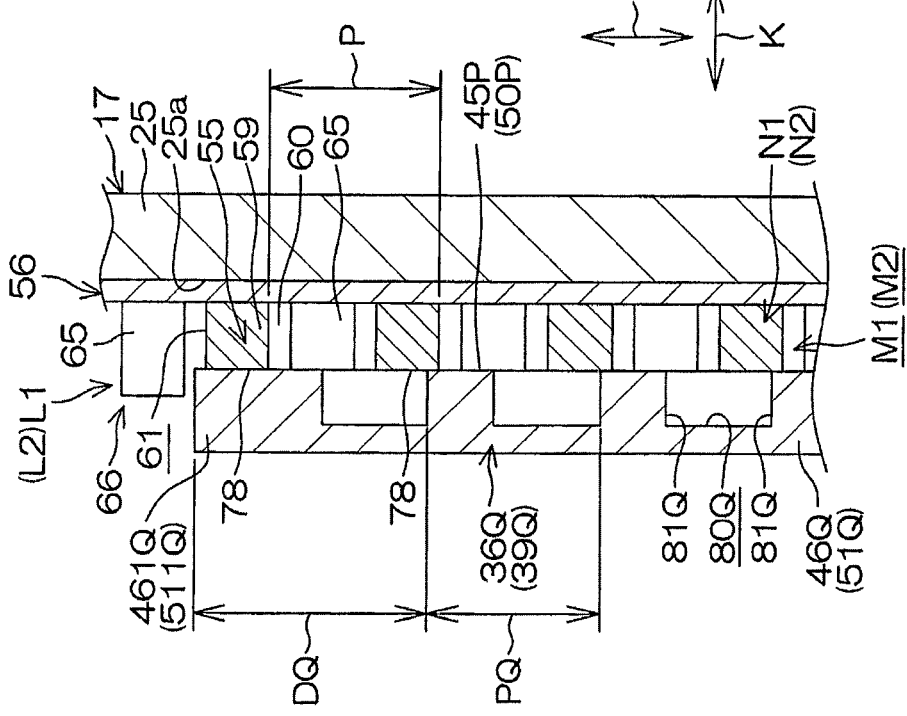

The second embodiment achieves the same effect as the effect of the first embodiment. In the locked state, when a shock in the tilt direction Y is applied to the steering member 2 upon a secondary collision, the tightening member 36P, 39P is engaged with the elastic tongue pieces 65, which are not warped and project from the grooves 61, in the tilt direction Y. In this event, the elastic tongue pieces 65 housed in the recessed grooves 80P in the pressing surface 45P, 50P of the tightening member 36P, 39P are engaged with the inner wall portions 81P of the corresponding recessed grooves 80P in the tilt direction Y. Consequently, movement of the tightening member 36P, 39P in the tilt direction Y is restricted. FIGS. 14A and 14B illustrate a third embodiment of the present invention. The third embodiment illustrated in FIG. 14A is different from the second embodiment illustrated in FIG. 13 in that a distance DQ between a first end portion 461Q, 511Q of a tightening plate 46Q, 51Q of a tightening member 36Q, 39Q on one side in the tilt direction Y and an inner wall portion 81Q of a recessed groove 80Q on the other side in the tilt direction Y does not coincide with an integer multiple of the arrangement pitch P of the elastic tongue pieces 65.

Figure 15:
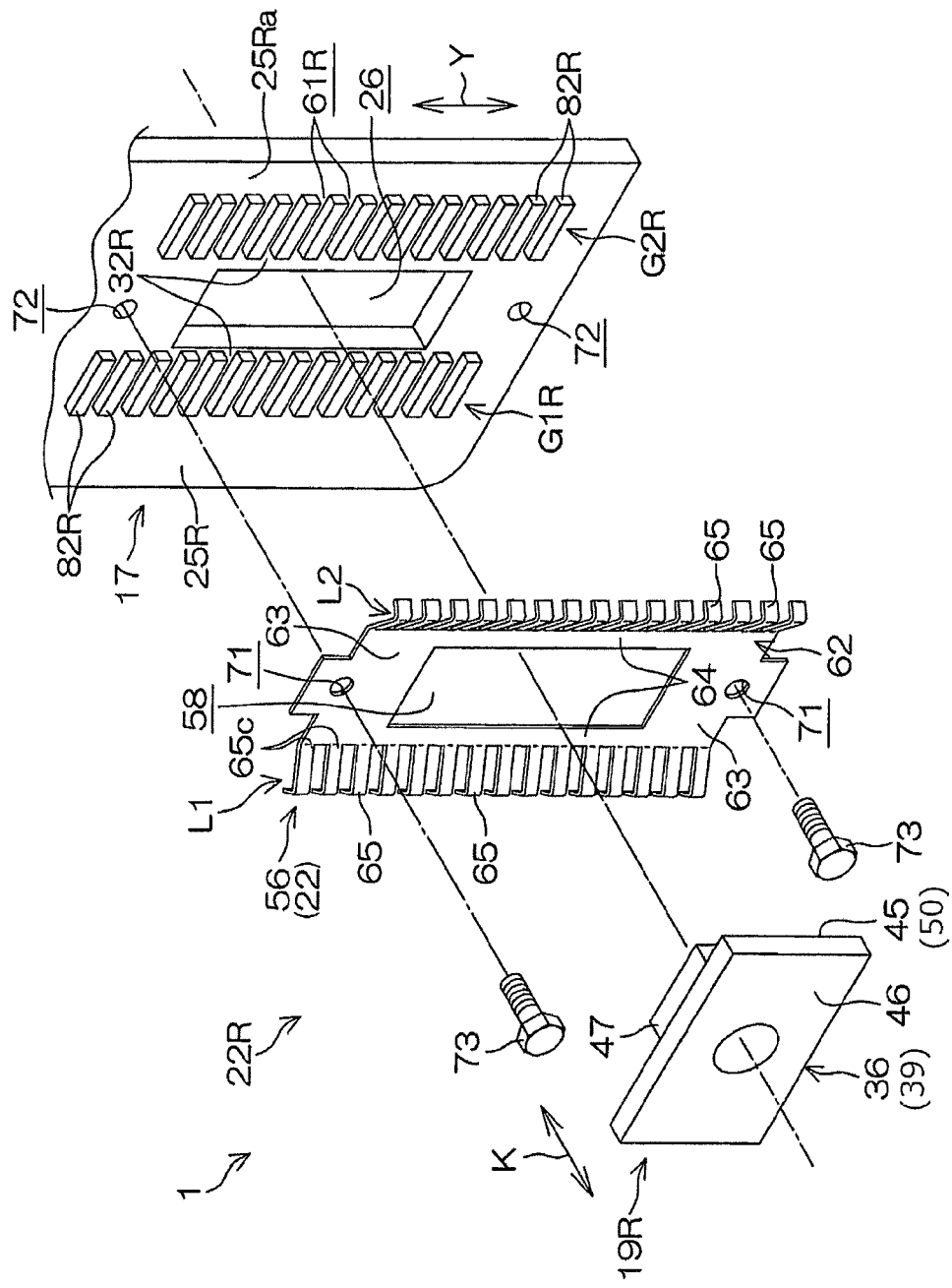
FIG. 15 is a perspective view of a lock device around one of first side plates of a first bracket according to a fourth embodiment of the present invention as disassembled.
Figure 16:
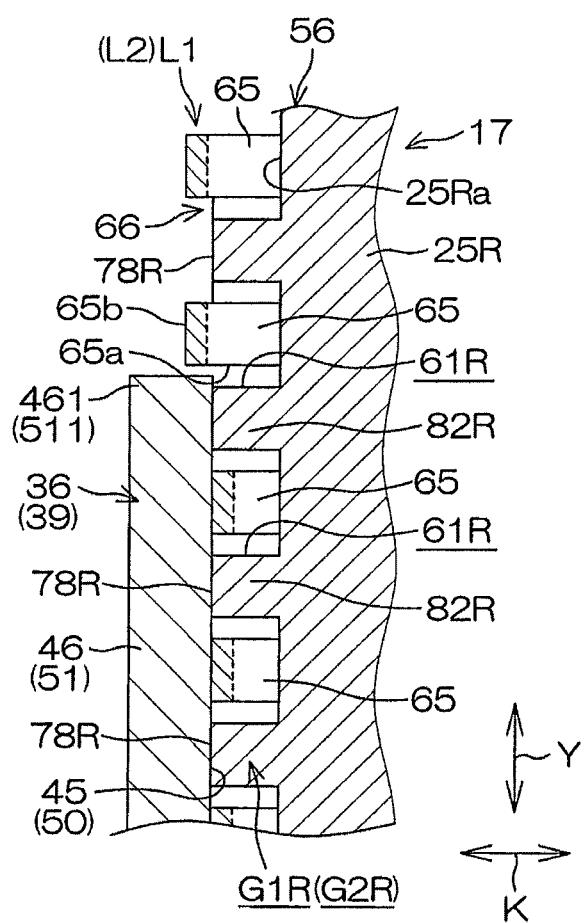
FIG. 16 is an enlarged view around a long groove in the one of the first side plates according to the fourth embodiment of the present invention.

In the third embodiment, as in the example of FIGS. 14A and 14B, a plurality of the recessed grooves 80Q are provided. It should be noted, however, that there may be only one recessed groove 80Q. An arrangement pitch PQ of the recessed grooves 80Q coincides with an integer multiple of the arrangement pitch P of the elastic tongue pieces 65. The third embodiment achieves the same effect as the effect of the first embodiment. The position of the tightening member 36Q, 39Q in the tilt direction Y is different between the case where the end portion 461Q, 511Q of the tightening member 36Q, 39Q and the corresponding elastic tongue piece 65 are engaged with each other in the tilt direction Y upon a secondary collision and the case where the inner wall portions 81Q of the recessed grooves 80Q and the corresponding elastic tongue pieces 65 are engaged with each other in the tilt direction Y when the steering column 8 is locked. That is, the position at which movement of the tightening member 36Q, 39Q in the tilt direction Y is restricted can be set with a smaller pitch interval (the difference between the distance DQ and the arrangement pitch PQ) than the arrangement pitch P of the elastic tongue pieces 65. Consequently, it is possible to reduce the maximum distance (corresponding to the pitch interval) over which the end portion 461Q, 511Q of the tightening member 36Q, 39Q moves until the end portion 461Q, 511Q is engaged with the elastic tongue pieces 65 projecting from the grooves 61 in the tilt direction Y. FIGS. 15 and 16 illustrate a fourth embodiment of the present invention. The fourth embodiment illustrated in FIG. 15 is different from the first embodiment illustrated in FIG. 3 in that a holding force improving mechanism 22R of a lock device 19R does not include the frame plate 55 (see FIG. 3).

The holding force improving mechanism 22R includes a pair of projected rib rows G1R and G2R formed on each of first side plates 25R (in FIG. 15, only one of the first side plates 25R is illustrated) in place of the frame plate 55. The pair of projected rib rows G1R and G2R each include a plurality of projected ribs 82R that serve as partitioning elements. The plurality of projected ribs 82R are provided integrally with and made of the same material as the corresponding first side plate 25R. The plurality of projected ribs 82R are equally spaced from each other in the tilt direction Y, and arranged in a grid shape. The plurality of projected ribs 82R are provided along longitudinal edge portions 32R of the first side plate 25R. The projected ribs 82R extend in a direction that is generally orthogonal to the tilt direction Y. A plurality of grooves 61R are formed between the plurality of projected ribs 82R in the tilt direction Y.

The tongue piece unit 56 is held on an outer surface 25Ra of the first side plate 25R by the pair of fixing screw bolts 73. The fixing screw bolts 73 are inserted through the corresponding screw insertion holes 71 of the tongue piece unit 56 to be screwed into the corresponding screw holes 72 of the first side plate 25R. As illustrated in FIG. 16, the corresponding elastic tongue piece 65 is housed in the groove 61R formed between the adjacent projected ribs 82R so as to be projectable. The top portions of the projected ribs 82R constitute a reception portion 78R that receives a tightening load applied by the corresponding tightening member 36, 39 with the elastic tongue pieces 65 pressed by the pressing surface 45, 50 of the corresponding tightening member 36, 39 to be retracted into the corresponding grooves 61R when the steering column 8 is locked.

Figure 17:
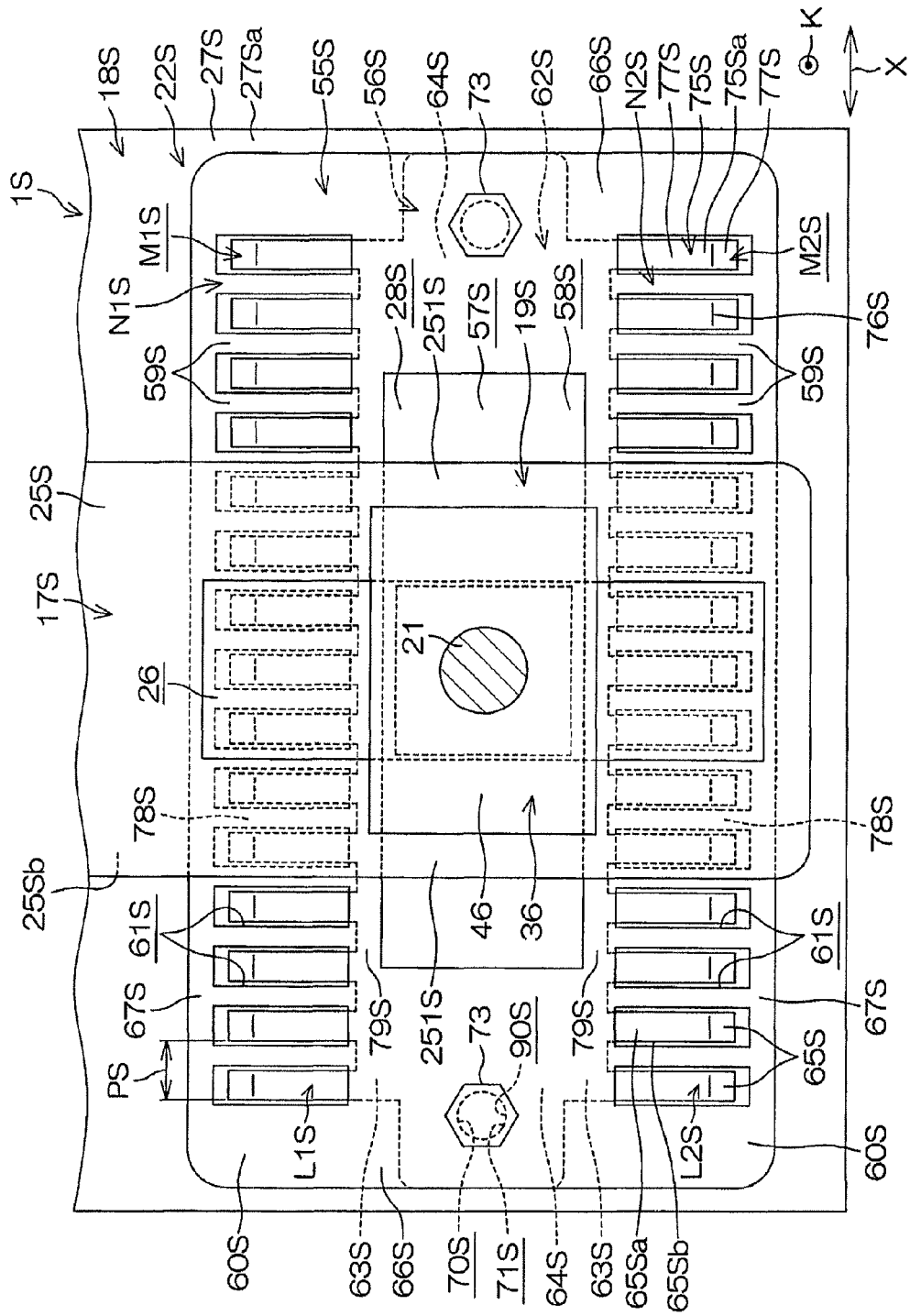
FIG. 17 illustrates the vicinity of one of first side plates according to a fifth embodiment of the present invention.

The embodiment achieves the same effect as the effect of the first embodiment. Further, the lock device 19R can be made thin and simplified by providing the plurality of projected ribs 82R which serve as partitioning elements integrally with the first side plate 25R. Hence, the steering system 1 can be made thin and simplified. FIG. 17 illustrates a fifth embodiment of the present invention. The fifth embodiment illustrated in FIG. 17 is different from the first embodiment illustrated in FIG. 1 in that a holding force improving mechanism 22S of a lock device 19S improves a holding force for holding the steering member 2 in position in the telescopic direction.

A steering system 1S according to the fifth embodiment is different from the steering system 1 according to the first embodiment. Specifically, the holding force improving mechanism 22S is held on an outer surface 27Sa of a second side plate 27S, and a first side plate 25S of a first bracket 17S has an inner surface 25Sb that serves as a pressing surface. As illustrated in FIG. 17, a telescopic long groove 28S in the second side plate 27S of a second bracket 18S includes a pair of longitudinal edge portions 79S that extend in the telescopic direction. The tightening shaft 21 is inserted through the tilt long groove 26, which serves as an insertion groove, of the first side plate 25S and the long groove 28S of the second side plate 27S.

The holding force improving mechanism 22S includes a tongue piece unit 56S and a frame plate 55S. The tongue piece unit 56S includes a frame plate 62S and two elastic tongue piece rows L1S and L2S. The frame plate 62S defines a long hole 58S that extends in the telescopic direction. The elastic tongue piece rows L1S and L2S each include a plurality of elastic tongue pieces 65S that are supported in a cantilever manner by the frame plate 62S. The plurality of elastic tongue pieces 65S of the elastic tongue piece rows L1S and L2S are arranged at equal intervals in the telescopic direction with an arrangement pitch PS. The long hole 58S overlaps the long groove 28S of the second side plate 27S as seen from the axial direction K.

The frame plate 62S includes a pair of horizontal frames 63S that serve as support portions and a pair of vertical frames 64S. The pair of horizontal frames 63S support the elastic tongue pieces 65S of the elastic tongue piece rows L1S and L2S. The pair of vertical frames 64S couple both end portions (end portions in the telescopic direction) of the pair of horizontal frames 63S to each other. The frame plate 55S includes a pair of horizontal frames 67S and a pair of vertical frames 66S. The horizontal frames 67S define a long hole 57S that extends in the telescopic direction. The pair of vertical frames 66S couple both end portions (end portions in the tilt direction Y) of the pair of horizontal frames 67S to each other. The long hole 57S overlaps the long groove 28S of the second side plate 27S as seen from the axial direction K.

Each horizontal frame 67S includes a groove row M1S, M2S and a partitioning portion row N1S, N2S. The groove rows M1S, M2S are each composed of a plurality of grooves 61S. Each groove row M1S, M2S houses the elastic tongue pieces 65S of the corresponding elastic tongue piece row L1S, L2S so that the elastic tongue pieces 65*s* are projectable. The partitioning portion rows N1S, N2S are each composed of a plurality of partitioning portions 59S that serve as partitioning elements. Each partitioning portion row N1S, N2S partitions the grooves 61S of the groove row M1S, M2S. Each horizontal frame 67S includes a pair of coupling frames 60S that couple the plurality of partitioning portions 59S of the corresponding partitioning portion row N1S, N2S to each other into a grid shape.

The frame plate 55S and the frame plate 62S of the tongue piece unit 56S have screw insertion holes 70S provided in the pair of vertical frames 66S of the frame plate 55S and screw insertion holes 71S provided in the pair of vertical frames 64S of the frame plate 62S of the tongue piece unit 56S, respectively. The frame plate 55S and the frame plate 62S of the tongue piece unit 56S are fixed to the second side plate 27S by a pair of fixing screw bolts 73 that are screwed into screw holes 90S of the second side plate 27S. In this state, the frame plate 62S of the tongue piece unit 56S is disposed between the frame plate 55S and the second side plate 27S.

The pair of horizontal frames 63S of the frame plate 62S of the tongue piece unit 56S are held between the outer surface 27Sa of the second side plate 27S and the frame plate 55S. In this state, each of the pair of horizontal frames 63S extends along the corresponding one of the longitudinal edge portions 79S. The elastic tongue pieces 65S extend in a direction that is generally orthogonal to the telescopic direction. Each of the elastic tongue pieces 65S is a plate piece, and includes a plate thickness surface 65Sa and a plate surface 65Sb. The plate thickness surface 65Sa faces in the telescopic direction, and extends in parallel with the plate thickness direction. The plate surface 65Sb extends in the telescopic direction.

The elastic tongue pieces 65S each include an angled portion 75S that includes a top portion 76S and a pair of inclined surface portions 77S disposed on both sides of the top portion 76S and inclined in directions opposite to each other. A part 75Sa of the angled portion 75S including the top portion 76S projects from the groove 61S toward the side opposite to the second side plate 27S. Movement of the elastic tongue pieces 65S in the telescopic direction is restricted by the partitioning portions 59S. In such a holding force improving mechanism 22S, the corresponding first side plate 25S faces the frame plate 55S attached to the second side plate 27S in the tightening direction (corresponding to the axial direction K). Some of the elastic tongue pieces 65S of the elastic tongue piece rows L1S and L2S face the inner surface 25Sb of the first side plate 25S in the tightening direction. In the unlocked state, the elastic tongue pieces 65S project from the corresponding grooves 61S toward the side opposite to the second side plate 27S.

When the operation lever 20 is operated to rotate in the lock direction to tighten the first side plate 25S in the tightening direction (corresponding to the axial direction K), some of the elastic tongue pieces 65S of the elastic tongue piece rows L1S and L2S in the telescopic direction are warped about a base end portion to bring the lock device 19S into a locked state. When the steering column 8 is locked, some of the elastic tongue pieces 65S of the elastic tongue piece rows L1S and L2S are pressed by the inner surface 25Sb, which serves as a pressing surface, of the corresponding first side plate 25S and warped. The elastic tongue pieces 65S warped by the first side plate 25S are retracted into the corresponding grooves 61S. In this state, a tightening load applied by the inner surface 25Sb of the first side plate 25S is received by a reception portion 78S constituted of the surfaces of the partitioning portions 59S of the partitioning portion rows N1S and N2S of the frame plate 55S.

When the steering column 8 is locked, the inner surface 25Sb of the corresponding first side plate 25S presses and warps some of the elastic tongue pieces 65S to retract the elastic tongue pieces 65S into the grooves 61S. Consequently, the corresponding first side plate 25S is interposed between the elastic tongue pieces 65S which are not warped and project from the grooves 61S in the telescopic direction. The first side plate 25S which is interposed between the elastic tongue pieces 65S which project from the grooves 61S is urged to move in the telescopic direction. In this event, an end portion 251S of the first side plate 25S in the telescopic direction and the plate thickness surfaces 65Sa of the elastic tongue pieces 65S, which are not warped and project from the grooves 61S, are engaged with each other so that the elastic tongue pieces 65S receive a load in the telescopic direction. Particularly, the part 75Sa of the angled portion 75S projecting from the groove 61S receives a load in the telescopic direction from the corresponding first side plate 25S because of the engagement between the end portion 251S of the first side plate 25S and the plate thickness surface 65Sa. In this event, the pair of inclined surface portions 77S are supported by the adjacent partitioning portion 59S. In this way, the angled portion 75S is supported on both sides in the load application direction (telescopic direction).

According to the embodiment, the inner surface 25Sb of the first side plate 25S can retract the elastic tongue pieces 65S into the grooves 61S. Consequently, the steering column 8 can be locked in position without causing so-called half lock irrespective of the position of the first side plate 25S in the telescopic direction. In the locked state, a shock in the telescopic direction is applied to the steering member 2 upon a secondary collision. In this event, the end portion 251S of the first side plate 25S in the telescopic direction abuts against the elastic tongue pieces 65S, which project from the grooves 61S so as to face the end portion 251S in the telescopic direction and movement of which in the telescopic direction is restricted by the corresponding partitioning portions 59S, and thus movement of the first side plate 25S in the telescopic direction is restricted. Consequently, members (the first side plate 25S and the elastic tongue pieces 65S which project from the grooves 61S) that face each other in the telescopic direction abut against each other in the telescopic direction. In this way, movement of the steering column in the telescopic direction is physically restricted, which achieves strong lock with a large holding force.

When the steering column 8 is locked, the reception portion 78S of the partitioning portions 59S receive a tightening load from the first side plate 25S, while the elastic tongue pieces 65S retracted into the grooves 61S do not receive an excessive tightening load. Hence, the durability of the elastic tongue pieces 65S can be improved. The partitioning portions 59S are provided to the frame plate 55S which is fixed along the outer surface 27Sa of the second side plate 27S. Therefore, the lock device 19S can be made thin compared to a steering system according to the related art which includes a plurality of plates to lock the steering column 8 in position through a friction force between the tightening members 36 and 39 and the first side plates 25S.

The pair of horizontal frames 63S of the tongue piece unit 56S are held between the frame plate 55S and the corresponding second side plate 27S. Consequently, the pair of horizontal frames 63S can be stably held on the second side plate 27S. The elastic tongue pieces 65S receive a load in the telescopic direction in the direction of the plate surface which is wider than the plate thickness surface 65Sa. This improves the strength against a load in the telescopic direction.

Figure 18:
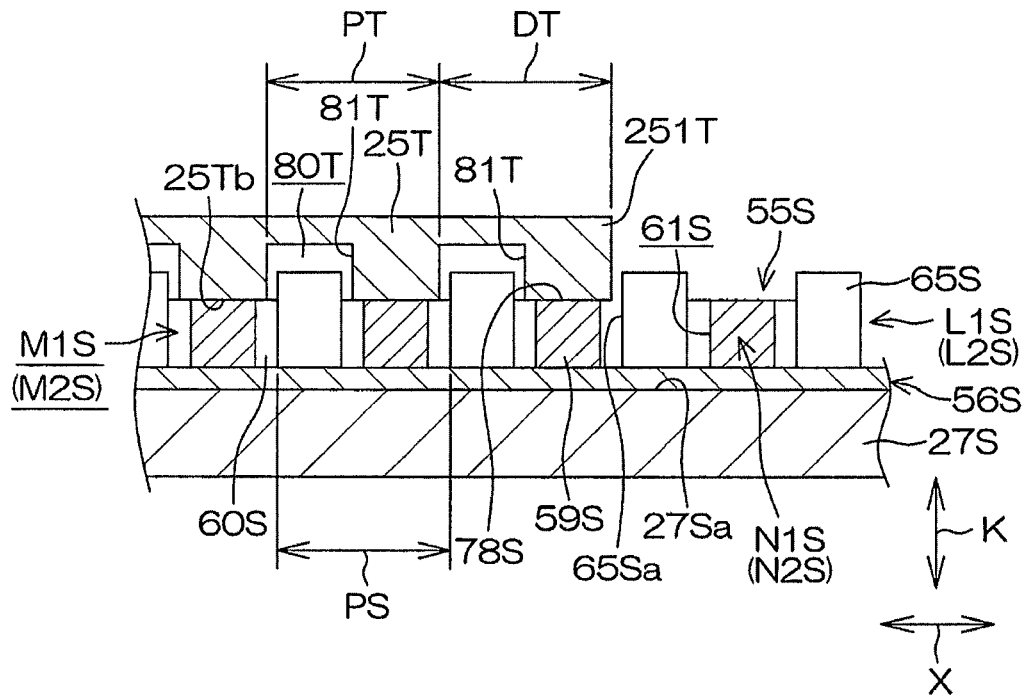
FIG. 18 is a sectional view illustrating the vicinity of one of second side plates according to a sixth embodiment of the present invention.

The angled portion 75S which projects from the groove 61 is supported on both sides by the partitioning portion 59S, which improves the strength against a load in the telescopic direction. FIG. 18 illustrates a sixth embodiment of the present invention. In the following description, constituent elements of the sixth embodiment of FIG. 18 that are the same as those of the fifth embodiment are given the same reference symbols to omit description (the same applies to FIGS. 19, 20 and 22).

The sixth embodiment illustrated in FIG. 18 is different from the fifth embodiment illustrated in FIG. 17 in that an inner surface 25Tb of a first side plate 25T includes at least one recessed groove 80T that houses the corresponding elastic tongue piece 65S when the steering column 8 is locked. In the sixth embodiment, as in the example of FIG. 18, a plurality of the recessed grooves 80T are provided. It should be noted, however, that there may be only one recessed groove 80T. As illustrated in FIG. 18, the recessed grooves 80T are portions of the inner surface 25Tb that are recessed in the plate thickness direction of the first side plate 25T (corresponding to the axial direction K). The recessed grooves 80T each include a pair of inner wall portions 81T that face the plate thickness surfaces 65Sa of the elastic tongue piece 65S in the tilt direction Y.

An arrangement pitch PT of the recessed grooves 80T in the telescopic direction coincides with an integer multiple of the arrangement pitch PS of the elastic tongue pieces 65S. In the example of FIG. 18, the arrangement pitch PT and the arrangement pitch PS coincide with each other. A distance DT between an end portion 251T of the first side plate 25T on one side in the telescopic direction and the inner wall portion 81T of each recessed groove 80T on the other side in the telescopic direction coincides with an integer multiple of the arrangement pitch PS.

Figure 19:
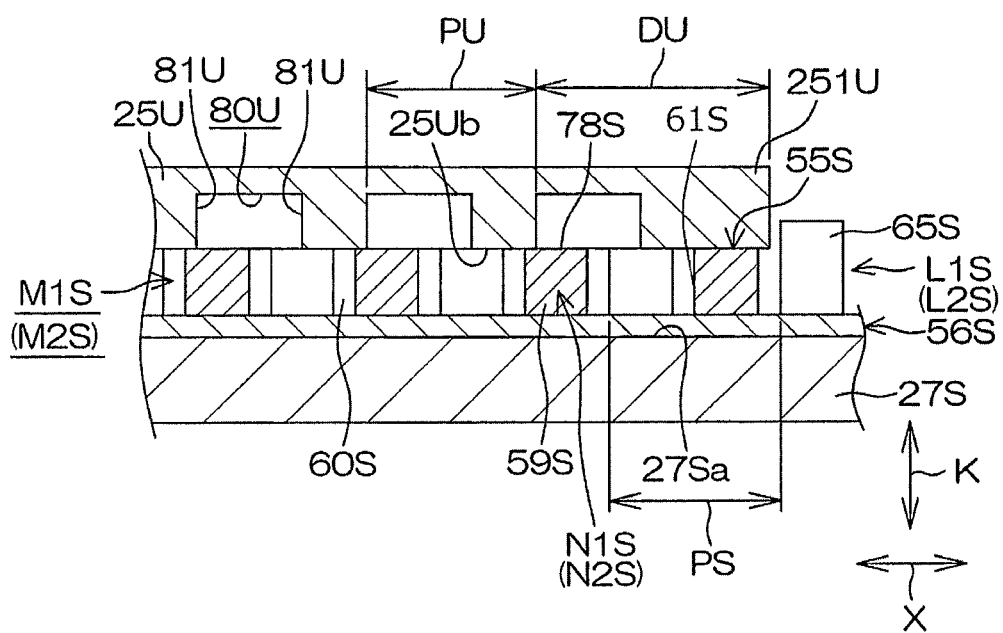
FIG. 19 is a sectional view illustrating the vicinity of a second side plate according to a seventh embodiment of the present invention.

The sixth embodiment achieves the same effect as the effect of the fifth embodiment. In the locked state, a shock in the telescopic direction is applied to the steering member 2 upon a secondary collision. In this event, the inner surface 25Tb of the first side plate 25T is engaged with the elastic tongue pieces 65 which are not warped and project from the grooves 61S in the telescopic direction. At the same time, the elastic tongue pieces 65S housed in the recessed grooves 80T in the inner surface 25Tb of the first side plate 25T are engaged with the corresponding inner wall portions 81T of the recessed grooves 80T in the telescopic direction. Consequently, movement of the first side plate 25T in the telescopic direction is restricted. FIG. 19 illustrates a seventh embodiment of the present invention. The seventh embodiment illustrated in FIG. 19 is different from the sixth embodiment illustrated in FIG. 18 in that a distance DU between an end portion 251U of a first side plate 25U on one side in the telescopic direction and an inner wall portion 81U of a recessed groove 80U on the other side in the telescopic direction does not coincide with the arrangement pitch PS of the elastic tongue pieces 65S.

Figure 20:
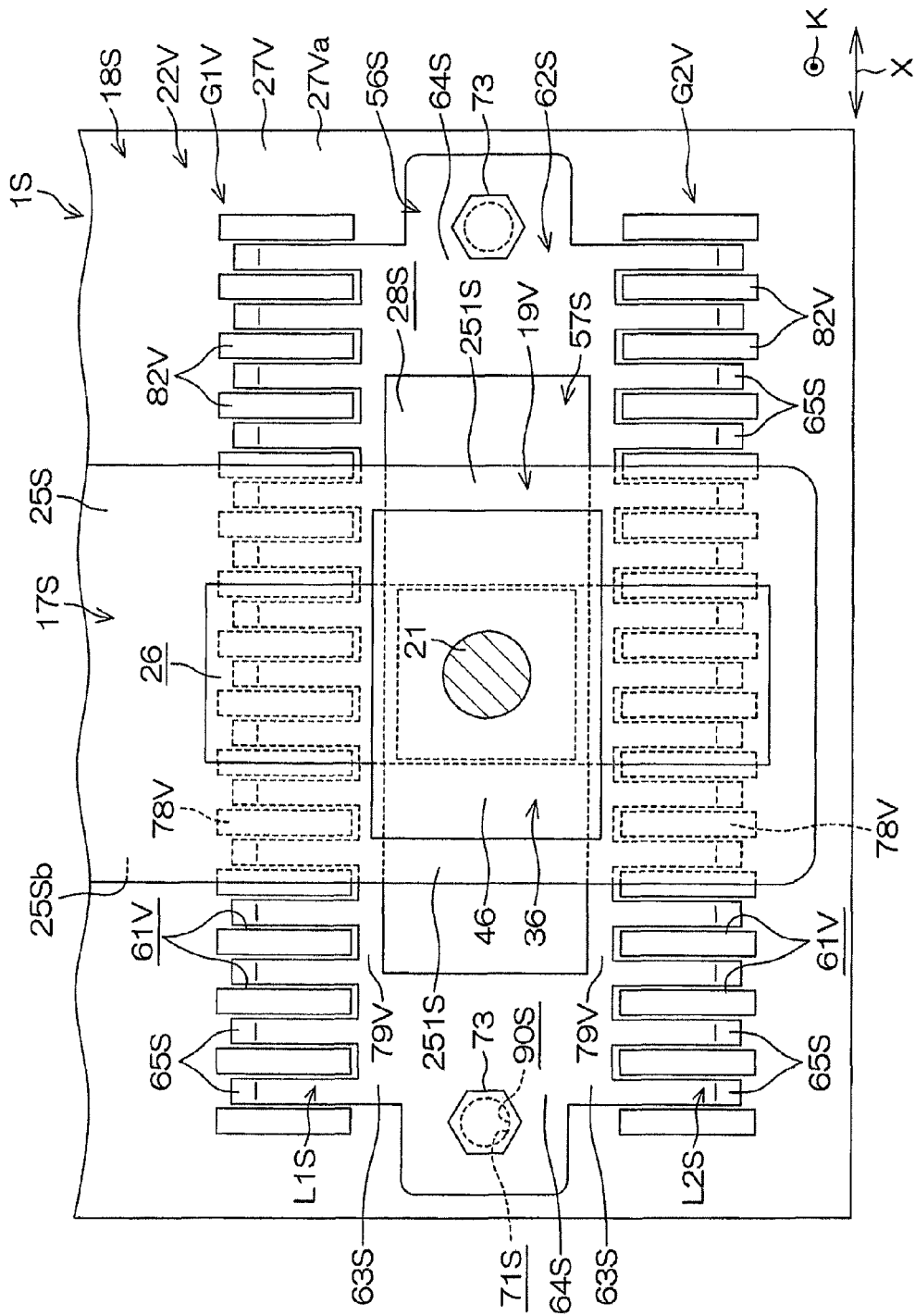
FIG. 20 illustrates the vicinity of one of second side plates according to an eighth embodiment of the present invention.

In the seventh embodiment, as in the example of FIG. 19, a plurality of recessed grooves 80U are provided. It should be noted, however, that there may be only one recessed groove 80U. An arrangement pitch PU of the recessed grooves 80U coincides with an integer multiple of the arrangement pitch PS of the elastic tongue pieces 65S. The seventh embodiment achieves the same effect as the effect of the fifth embodiment. The position of the first side plate 25U in the telescopic direction is different between the case where the end portion 251U of the first side plate 25U and the corresponding elastic tongue piece 65S are engaged with each other in the telescopic direction upon a secondary collision and the case where the inner wall portions 81U of the recessed grooves 80U and the corresponding elastic tongue pieces 65S are engaged with each other in the telescopic direction when the steering column 8 is locked. That is, the position at which movement of the first side plate 25U in the telescopic direction is restricted can be set with a smaller pitch interval (the difference between the distance DU and the arrangement pitch PU) than the arrangement pitch of the elastic tongue pieces 65S. Consequently, it is possible to reduce the maximum distance (corresponding to the pitch interval) over which the end portion 251U of the first side plate 25U moves until the end portion 251U is engaged with the elastic tongue pieces 65S projecting from the grooves 61S in the telescopic direction. FIG. 20 illustrates an eighth embodiment of the present invention. The eighth embodiment illustrated in FIG. 20 is different from the fifth embodiment illustrated in FIG. 17 in that a holding force improving mechanism 22V of a lock device 19V does not include the frame plate 55S (see FIG. 17).

The holding force improving mechanism 22V includes a pair of projected rib rows G1V and G2V formed on each of second side plates 27V (in FIG. 20, only one of the second side plates 27V is illustrated) in place of the frame plate 55S. The pair of projected rib rows G1V and G2V each include a plurality of projected ribs 82V that serve as partitioning elements. The plurality of projected ribs 82V are provided integrally with and made of the same material as the corresponding second side plate 27V. The plurality of projected ribs 82V are equally spaced from each other in the telescopic direction, and arranged in a grid shape. The plurality of projected ribs 82V are provided along longitudinal edge portions 79V of the second side plate 27V. The projected ribs 82V extend in a direction that is generally orthogonal to the telescopic direction. A plurality of grooves 61V are formed between the plurality of projected ribs 82V in the telescopic direction.

The tongue piece unit 56S is held on an outer surface 27Va of the second side plate 27V by the pair of fixing screw bolts 73. The fixing screw bolts 73 are inserted through the corresponding screw insertion holes 71S of the tongue piece unit 56S to be screwed into the corresponding screw holes 90S of the second side plate 27V.

The corresponding elastic tongue piece 65S is housed in the groove 61V formed between the adjacent projected ribs 82V so as to be projectable. The top portions of the projected ribs 82V constitutes a reception portion 78V that receives a tightening load applied by the corresponding first side plate 25S with the elastic tongue pieces 65S pressed by the inner surface 25Sb of the corresponding first side plate 25S to be retracted into the corresponding grooves 61V when the steering column 8 is locked.

Figure 21:
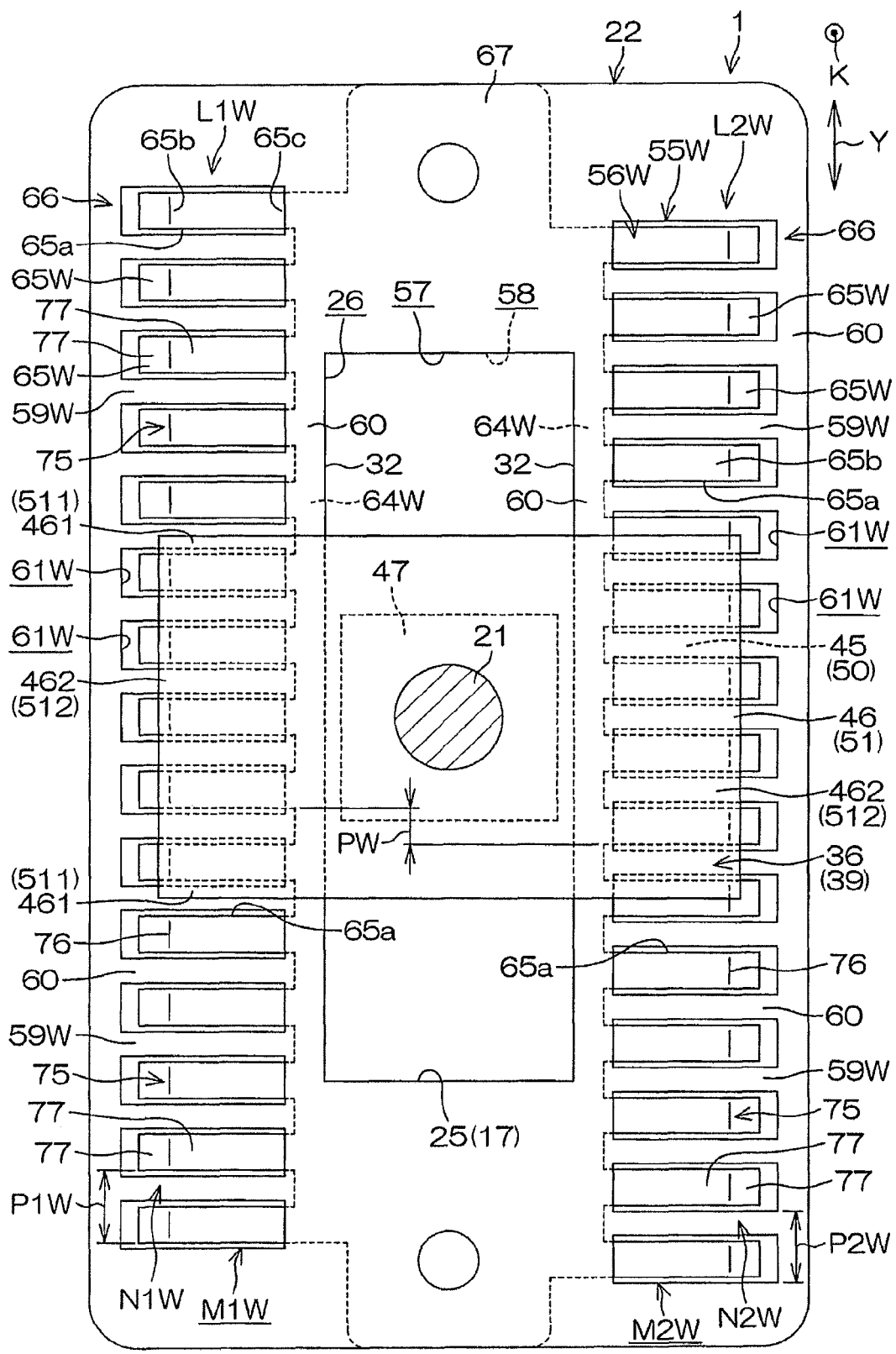
FIG. 21 illustrates the vicinity of one of first side plates according to a ninth embodiment of the present invention.

The eighth embodiment achieves the same effect as the effect of the fifth embodiment. Further, the lock device 19V can be made thin and simplified by providing the plurality of projected ribs 82V integrally with the second side plate 27V. Hence, the steering system 1S can be made thin and simplified. FIG. 21 illustrates a ninth embodiment of the present invention. The ninth embodiment illustrated in FIG. 21 is different from the first embodiment illustrated in FIG. 9 in that the phase of arrangement of elastic tongue pieces 65W that are supported by one of a pair of vertical frames 64W of a tongue piece unit 56W that serve as support portions to form an elastic tongue piece row L1W and the phase of arrangement of elastic tongue pieces 65W that are supported by the other of the pair of vertical frames 64W to form an elastic tongue piece row L2W are different from each other.

An arrangement pitch P1W of the elastic tongue pieces 65W of the elastic tongue piece row L1W and an arrangement pitch P2W of the elastic tongue pieces 65W of the elastic tongue piece row L2W are equal to each other. The difference between the phase of arrangement of the elastic tongue pieces 65W of the elastic tongue piece row L1W and the phase of arrangement of the elastic tongue pieces 65W of the elastic tongue piece row L2W corresponds to half the arrangement pitch P1W (P2W). Each of a pair of vertical frames 66W of a frame plate 55W includes a groove row M1W, M2W and a partitioning portion row N1W, N2W. The groove row M1W, M2W houses the elastic tongue pieces 65W of the corresponding elastic tongue piece row L1W, L2W so that the elastic tongue pieces 65W are projectable. The groove row M1W, M2W is composed of a plurality of grooves 61W. The partitioning portion row N1W, N2W partitions the grooves 61W of the groove row M1W, M2W. The partitioning portion row N1W, N2W is composed of a plurality of partitioning portions 59W that serve as partitioning elements.

Figure 22:
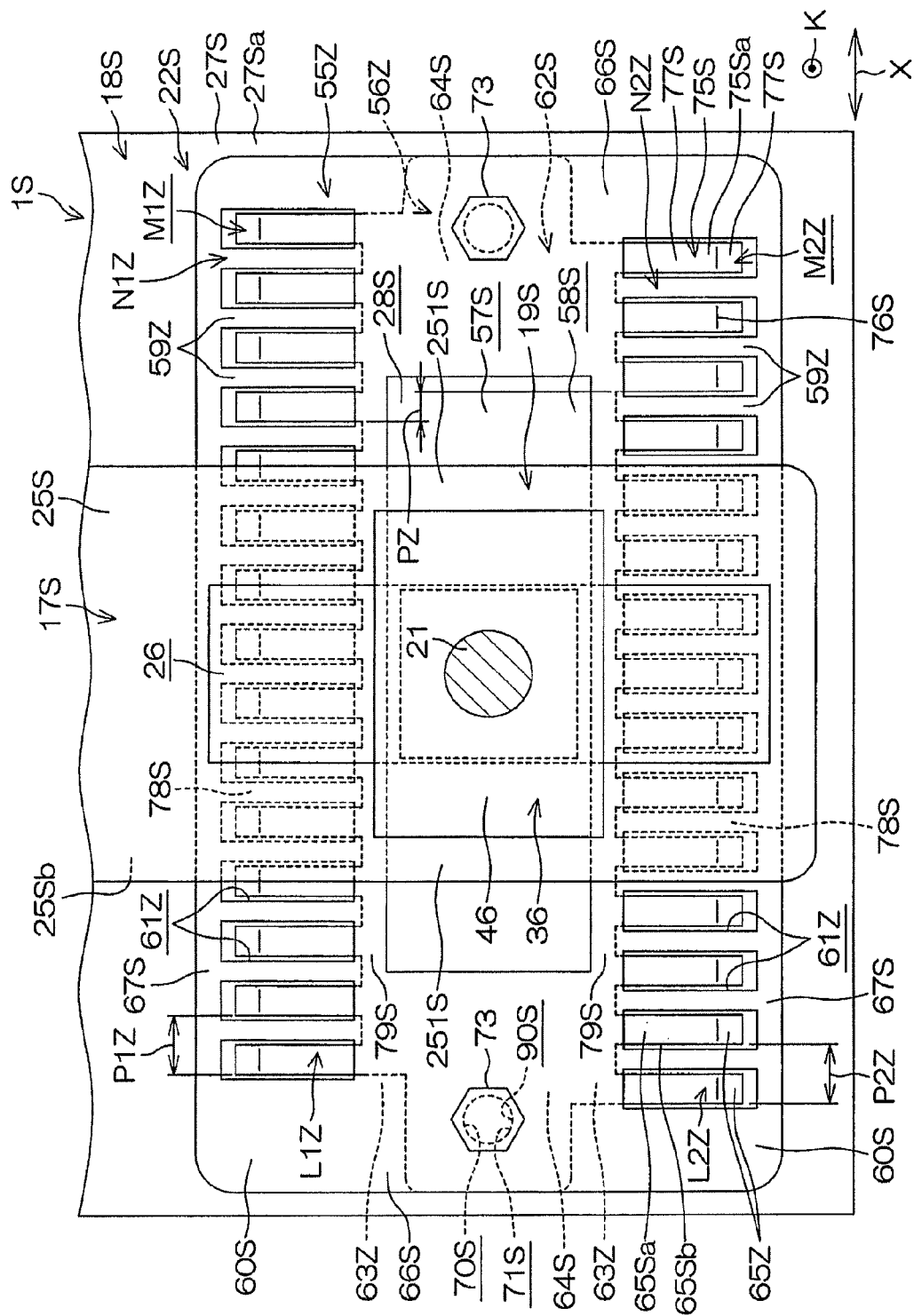
FIG. 22 illustrates the vicinity of one of second side plates according to a tenth embodiment of the present invention.

The ninth embodiment achieves the same effect as the effect of the first embodiment. The position at which movement of the tightening member 36, 39 in the tilt direction Y is restricted upon a secondary collision can be set with a smaller pitch interval PW than the arrangement pitch P1W, P2W of the elastic tongue pieces 65W of the elastic tongue piece row L1W, L2W. Consequently, it is possible to reduce the maximum distance (corresponding to the pitch interval PW) over which the end portion 461, 511 of the tightening member 36, 39 moves until the end portion 461, 511 is engaged with the elastic tongue pieces 65W projecting from the grooves 61W in the tilt direction Y. FIG. 22 illustrates a tenth embodiment of the present invention. The tenth embodiment illustrated in FIG. 22 is different from the fifth embodiment illustrated in FIG. 17 in that the phase of arrangement of elastic tongue pieces 65Z that are supported by one of a pair of horizontal frames 63Z of a tongue piece unit 56Z that serve as support portions to form an elastic tongue piece row L1Z and the phase of arrangement of elastic tongue pieces 65Z that are supported by the other of the pair of horizontal frames 63Z to form an elastic tongue piece row L2Z are different from each other.

An arrangement pitch P1Z of the elastic tongue pieces 65Z of the elastic tongue piece row L1Z and an arrangement pitch P2Z of the elastic tongue pieces 65Z of the elastic tongue piece row L2Z are equal to each other. The difference between the phase of arrangement of the elastic tongue pieces 65Z of the elastic tongue piece row L1Z and the phase of arrangement of the elastic tongue pieces 65Z of the elastic tongue piece row L2Z corresponds to half the arrangement pitch P1Z (P2Z). Each of a pair of vertical frames 66Z of a frame plate 55Z includes a groove row M1Z, M2Z and a partitioning portion row N1Z, N2Z composed of a plurality of partitioning portions 59Z that serve as partitioning elements that partition grooves 61Z of the groove row M1Z, M2Z. The groove row M1Z, M2Z houses the elastic tongue pieces 65Z of the corresponding elastic tongue piece row L1Z, L2Z so that the elastic tongue pieces 65Z are projectable. The groove row M1Z, M2Z is composed of a plurality of grooves 61Z. The partitioning portion row N1Z, N2Z partitions the grooves 61Z of the groove row M1Z, M2Z. The partitioning portion row N1Z, N2Z is composed of a plurality of partitioning portions 59Z that serve as partitioning elements.

The tenth embodiment achieves the same effect as the effect of the fifth embodiment. The position at which movement of the first side plate 25S in the telescopic direction is restricted upon a secondary collision can be set with a smaller pitch interval PZ than the arrangement pitch P1Z, P2Z of the elastic tongue pieces 65Z of the elastic tongue piece row L1Z, L2Z. Consequently, it is possible to reduce the maximum distance (corresponding to the pitch interval PZ) over which the end portion 251S of the first side plate 25S moves until the end portion 251S is engaged with the elastic tongue pieces 65Z projecting from the grooves 61Z in the telescopic direction.

The present invention is not limited to the embodiments described above, and may be modified in various ways without departing from the scope and spirits of the claims.

What is claimed is:

1. A steering system that is capable of tilt adjustment, comprising:
    a steering shaft, to one end of which a steering member is coupled;
    a tubular steering column that supports the steering shaft;
    a first bracket that is fixed to a vehicle body and that includes a pair of first side plates;
    a second bracket that is fixed to the steering column and that includes a pair of second side plates; and
    a lock device that locks the steering column in position and that includes a tightening shaft inserted through tilt long grooves of the first side plates and insertion grooves of the second side plates, an operation lever that rotates together with the tightening shaft, and a pair of tightening members that include a pressing surface, that are supported by the tightening shaft to move in accompaniment with the tightening shaft and the steering column during tilt adjustment, and that tighten each of the first side plates to a corresponding one of the second side plates as the operation lever is operated to rotate in a lock direction, wherein:
    the tilt long grooves each include a pair of longitudinal edge portions that extend in a tilt direction;
    the lock device further includes
        a tongue piece unit that includes a support portion provided along at least one of the longitudinal edge portions of at least one of the first side plates, and a plurality of elastic tongue pieces supported in a cantilever manner by the support portion to extend from the support portion in a direction that is generally orthogonal to the tilt direction to form a row that extends in the tilt direction, the elastic tongue pieces being pressed by the pressing surface of the corresponding tightening member and warped when the steering column is locked, and
        partitioning elements, between which a plurality of grooves are formed to house the elastic tongue pieces so as to be projectable, that are capable of restrict movement of the corresponding elastic tongue pieces in the tilt direction, and that are formed on an outer surface of the corresponding first side plate or a member held on the outer surface; and
    when the steering column is locked, the pressing surface of the corresponding tightening member presses some of the elastic tongue pieces to retract the elastic tongue pieces into the grooves so that the corresponding tightening member is interposed between the elastic tongue pieces projecting from the grooves in the tilt direction.

2. The steering system according to claim 1, wherein the partitioning elements include a reception portion that receives a tightening load applied by the corresponding tightening member with the elastic tongue pieces pressed by the pressing surface of the corresponding tightening member retracted into the corresponding grooves when the steering column is locked.

3. The steering system according to claim 1, wherein the member held on the outer surface of the corresponding first side plate is a frame plate that includes the plurality of partitioning elements and a coupling frame that couples the plurality of partitioning elements into a grid shape, the frame plate being fixed along the outer surface of the corresponding first side plate.

4. The steering system according to claim 3, wherein the support portion of the tongue piece unit is held between the frame plate and the corresponding first side plate.

5. The steering system according to claim 1, wherein the plurality of partitioning elements are a plurality of projected ribs provided integrally with and made of the same material as the corresponding first side plate, the projected ribs being arranged in a grid shape.

6. The steering system according to claim 1, wherein:
    the pressing surface of the tightening member includes at least one recessed groove that houses the corresponding elastic tongue piece when the steering column is locked; and
    the recessed groove includes a pair of inner wall portions that are engageable with the elastic tongue piece housed in the recessed groove on a corresponding side in the tilt direction when the steering column is locked.

7. The steering system according to claim 6, wherein
a distance between an end portion of the tightening member on one side in the tilt direction and the inner wall portion of the recessed groove on the other side in the tilt direction does not coincide with an integer multiple of an arrangement pitch of the elastic tongue pieces in the tilt direction.

8. The steering system according to claim 1, wherein
as the support portion, a pair of support portions are provided along the pair of longitudinal edge portions, and a phase of arrangement of the elastic tongue pieces supported by one of the pair of support portions to form the row and a phase of arrangement of the elastic tongue pieces supported by the other of the pair of support portions to form the row are different from each other.

9. The steering system according to claim 1, wherein
the elastic tongue pieces are each a plate piece that includes a plate thickness surface that faces in the tilt direction and a plate surface that extends in the tilt direction, and a width of the plate surface in the tilt direction is larger than a plate thickness.

10. The steering system according to claim 9, wherein:
the plate piece that serves as the elastic tongue piece includes an angled portion that has, as a portion that projects from the corresponding groove, a top portion and a pair of inclined surface portions disposed on both sides of the top portion and inclined in directions opposite to each other; and
the pair of inclined surface portions are supported by the partitioning element so that the angled portion is supported on both sides when the angled portion projecting from the corresponding groove receives a load in the tilt direction from the corresponding tightening member.

11. A steering system that is capable of telescopic adjustment, comprising:
a steering shaft, to one end of which a steering member is coupled;
a tubular steering column that supports the steering shaft;
a first bracket that is fixed to a vehicle body and that includes a pair of first side plates;
a second bracket that is fixed to the steering column and that includes a pair of second side plates; and
a lock device that locks the steering column in position and that includes a tightening shaft inserted through insertion grooves of the first side plates and telescopic long grooves of the second side plates, an operation lever that rotates together with the tightening shaft, and a pair of tightening members that include a pressing surface, that are supported by the tightening shaft to move in accompaniment with the tightening shaft and the steering column during telescopic adjustment, and that tighten each of the first side plates to a corresponding one of the second side plates as the operation lever is operated to rotate in a lock direction, wherein:
the telescopic long grooves each include a pair of longitudinal edge portions that extend in a telescopic direction;
the lock device further includes
a tongue piece unit that includes a support portion provided along at least one of the longitudinal edge portions of at least one of the second side plates, and a plurality of elastic tongue pieces supported in a cantilever manner by the support portion to extend from the support portion in a direction that is generally orthogonal to the telescopic direction to form a row that extends in the telescopic direction, the elastic tongue pieces being pressed by a pressing surface of the corresponding first side plate and warped when the steering column is locked, and
partitioning elements, between which a plurality of grooves are formed to house the elastic tongue pieces so as to be projectable, that are capable of restrict movement of the corresponding elastic tongue pieces in the telescopic direction, and that are formed on an outer surface of the corresponding second side plate or a member held on the outer surface; and
when the steering column is locked, the pressing surface of the corresponding first side plate presses some of the elastic tongue pieces to retract the elastic tongue pieces into the grooves so that the corresponding first side plate is interposed between the elastic tongue pieces projecting from the grooves in the telescopic direction.

12. The steering system according to claim 11, wherein
the partitioning elements include a reception portion that receives a tightening load applied by the corresponding first side plate with the elastic tongue pieces pressed by the pressing surface of the corresponding first side plate retracted into the corresponding grooves when the steering column is locked.

13. The steering system according to claim 11, wherein
the member held on the outer surface of the corresponding second side plate is a frame plate that includes the plurality of partitioning elements and a coupling frame that couples the plurality of partitioning elements into a grid shape, the frame plate being fixed along the outer surface of the corresponding second side plate.

14. The steering system according to claim 13, wherein
the support portion of the tongue piece unit is held between the frame plate and the corresponding second side plate.

15. The steering system according to claim 11, wherein
the plurality of partitioning elements are a plurality of projected ribs provided integrally with and made of the same material as the corresponding second side plate, the projected ribs being arranged in a grid shape.

16. The steering system according to claim 11, wherein:
the pressing surface of the first side plate includes at least one recessed groove that houses the corresponding elastic tongue piece when the steering column is locked; and
the recessed groove includes a pair of inner wall portions that are engageable with the elastic tongue piece housed in the recessed groove on a corresponding side in the telescopic direction when the steering column is locked.

17. The steering system according to claim 16, wherein
a distance between an end portion of the tightening member on one side in the telescopic direction and the inner wall portion of the recessed groove on the other side in the telescopic direction does not coincide with an integer multiple of an arrangement pitch of the elastic tongue pieces in the telescopic direction.

18. The steering system according to claim 11, wherein
as the support portion, a pair of support portions are provided along the pair of longitudinal edge portions, and a phase of arrangement of the elastic tongue pieces supported by one of the pair of support portions to form the row and a phase of arrangement of the elastic tongue pieces supported by the other of the pair of support portions to form the row are different from each other.

19. The steering system according to claim 11, wherein the elastic tongue pieces are each a plate piece that includes a plate thickness surface that faces in the telescopic direction and a plate surface that extends in the telescopic direction, and a width of the plate surface in the telescopic direction is larger than a plate thickness.

20. The steering system according to claim 19, wherein:
the plate piece that serves as the elastic tongue piece includes an angled portion that has, as a portion that projects from the corresponding groove, a top portion and a pair of inclined surface portions disposed on both sides of the top portion and inclined in directions opposite to each other; and
the pair of inclined surface portions are supported by an edge portion of the groove so that the angled portion is supported on both sides when the angled portion projecting from the corresponding groove receives a load in the telescopic direction from the corresponding first side plate.

\* \* \* \* \*